United States Patent [19]
Baxter

[11] Patent Number: 5,826,096
[45] Date of Patent: Oct. 20, 1998

[54] MINIMAL INSTRUCTION SET COMPUTER ARCHITECTURE AND MULTIPLE INSTRUCTION ISSUE METHOD

[75] Inventor: Michael Alan Baxter, Sunnyvale, Calif.

[73] Assignee: Apple Computer, Inc., Cupertino, Calif.

[21] Appl. No.: 446,086

[22] Filed: May 19, 1995

Related U.S. Application Data

[63] Continuation of Ser. No. 129,697, Sep. 30, 1993, Pat. No. 5,481,743.
[51] Int. Cl.$^6$ .................................................. G06F 15/00
[52] U.S. Cl. ........................... 395/800.24; 395/800.23; 395/391; 395/392; 395/573
[58] Field of Search .................................... 395/800, 375, 395/700, 391, 392, 573, 800.24, 800.23

[56] References Cited

U.S. PATENT DOCUMENTS

| | | | |
|---|---|---|---|
| 5,019,968 | 5/1991 | Wang et al. | 395/800.04 |
| 5,488,729 | 1/1996 | Vegesna et al. | 395/385 |
| 5,497,499 | 3/1996 | Garg et al. | 395/393 |
| 5,530,817 | 6/1996 | Masubuchi | 395/800.24 |

FOREIGN PATENT DOCUMENTS

| | | |
|---|---|---|
| 0411747 | 2/1991 | European Pat. Off. . |
| 0479390 | 4/1992 | European Pat. Off. . |
| 0492968 | 7/1992 | European Pat. Off. . |
| 8909447 | 10/1989 | WIPO . |

OTHER PUBLICATIONS

Findlay et al., "HARP A VUW RISC Processor," IEEE, 1991, pp. 368–372.

Ahmad, "Graphing Variables into Multiple & Memories for Data Path Synthesis," IEEE, 1992, pp. 663–666.

Bretenite et al, "Architecture Synthesis of High–Performance Application—Specific Processor," IEEE, 1990, pp. 542–548.

Mike Johnson, *Superscalar Microprocessor Design*, 1991.

Dwyer et al., "A Fast Instruction Dispatch Unit for Multiple and Out–of–Sequence Issuances", EE–CEG–87–15, 1987, pp. 1–11 and figures 1–8.

Robert P. Colwell et al, "Architecture and Implementation of a VLIW Supercomputer", IEEE Computer Society Press, Nov. 1990, pp. 910–919.

*Primary Examiner*—Alyssa H. Bowler
*Assistant Examiner*—John Follansbee
*Attorney, Agent, or Firm*—Greg T. Sueoka; Mark A. Aaker

[57] ABSTRACT

A minimal instruction set computer architecture (hyperscalar computer architecture) comprises a central memory, an instruction buffer, a control unit, an I/O control unit, a plurality of functional units, a plurality of register files, and a data router. In the hyperscalar computer architecture, the central memory transfers a plurality of instructions to the instruction buffer. The control unit receives multiple instructions from the instruction buffer, and automatically determines and issues the largest subset of instructions from those received that can be simultaneously issued to the plurality of functional units. Each functional unit receives data from and returns computational results to a corresponding register file. The data router serves to transfer data between each register file and any other register file, the central memory, the control unit, or the I/O control unit. The present invention also includes a multiple instruction issue method for issuing instructions to the hyperscalar computer architecture. The multiple instruction issue method comprises the steps of: determining a set of first source register files used by a plurality of instructions; determining a set of second source register files used by the plurality of instructions; determining a set of destination register files used by the plurality of instructions; determining a largest subset of instructions within the plurality of instructions that can be executed without a register file conflict; and issuing in parallel each instruction within the largest subset to the plurality of functional units.

4 Claims, 14 Drawing Sheets

MINIMAL INSTRUCTION SET COMPUTER ARCHITECTURE AND MULTIPLE INSTRUCTION ISSUE METHOD

This is a continuation of application Ser. No. 08/129,697, filed on Sep. 30, 1993, which issued on Jan. 2, 1996 as U.S. Pat. No. 5,481,743.

BACKGROUND OF THE INVENTION

1. Field of the Invention

The present invention relates generally to computer architecture, and more particularly to computer architectures that are capable of processing more than one instruction during each computer system clock cycle. Still more particularly, the present invention is a computer architecture for processing multiple scalar instructions in parallel using a minimal instruction set.

2. Description of the Background Art

In present day computing applications, the amount of data that must be processed is often quite large. For example, in image processing, approximately six Megabytes of data are required to represent a 1024 by 768 pixel color image. If a single image requires multiple transformations, or if two or more images are to be combined into a composite image, the data set on which operations are required becomes even larger. As the size of the data set increases, the time required to complete a set of computational operations on the data set eventually becomes unacceptably long. The need to maximize the number of operations that can be performed on a given set of data in the least amount of time has served as the major driving force in the evolution of computer architectures.

Reduced Instruction Set Computing (RISC) architectures attempt to meet this need by increasing the speed at which each computational instruction supported is performed. RISC is based upon the premise that a complex computational instruction can typically be performed through a corresponding sequence of simple instructions. The smallest number of simple instructions required to fully implement a complete instruction set are chosen as the RISC instruction set. A given RISC architecture is designed to execute each simple instruction in its instruction set very quickly, such that a given complex instruction can be executed very rapidly as a corresponding sequence of simple instructions. A block diagram of an exemplary RISC architecture is shown in FIG. 1. This architecture comprises a memory, a data cache, an instruction cache, pipelined instruction decoding, a register file, a floating-point functional unit, and an integer functional unit. In the RISC architecture, either the integer functional unit or the floating-point functional unit can be used for a given computation.

All data transferred between the register file and the memory in the RISC architecture must pass through the data cache. The data cache serves as a high-speed, small capacity memory. A data cache size of 16 kilobytes is currently common (1993). Hence, in a data-intensive computational environment such as image processing, the data cache can store only a very small portion of the total amount of data that must be processed. Presently, a backing cache is occasionally used between a CPU's internal cache and memory to provide additional cache storage. In the future, cache sizes will increase as improvements are made in microelectronic processing technology. Regardless of the cache situation (present or future), a cache serves as an information "bottleneck" between the memory and the register file. This limits the overall processing speed of the RISC architecture, particularly in data-intensive applications. Therefore, RISC architectures are not well-suited for processing large amounts of data, such as in image or document processing, since access to any data element stored within memory necessitates routing the data element through the data cache.

Other architectures attempt to rapidly process large amounts of data by performing multiple instructions simultaneously. One such architecture is a vector computer, in which data elements within an array each receive the same operation simultaneously. Vector computers require specialized hardware to function, which adversely affects the cost of system design and manufacture. A vector computer must also include a scalar processing unit to successfully perform computations in situations where individual data elements must each receive a unique operation. A highly specialized compiler must be used to maximize the amount of data that can be operated upon in an array format. Such a compiler requires many person-years to develop, and is therefore prohibitively expensive, making vector computers unavailable for most computing needs.

A second architecture that attempts to rapidly process large amounts of data by performing multiple instructions simultaneously is a multiprocessor architecture, where several processing units simultaneously operate upon data, and each processing unit attends to a different portion of a given computation. However, each processing unit significantly increases the cost of manufacturing the system. Moreover, a highly specialized compiler is also necessary in this second architecture, to ensure that computational tasks are optimally distributed between each processor. Such a compiler is again prohibitively expensive, making the multiprocessor an undesirable option.

A third type of architecture that performs multiple instructions simultaneously is that of a pipelined computer. In pipelined computers, the hardware elements required for data storage and performance of arithmetic and logical operations are duplicated. Each set of duplicated hardware elements operates on a given subset of data in parallel. Yet again, a highly specialized compiler is required to maximize the number of hardware elements that are actively processing data at any given time, and the compiler is prohibitively expensive.

Other architectures are combinations of those mentioned above. These are even more complex and more expensive than those previously mentioned, and are therefore undesirable. What is needed is a computer architecture for rapidly performing computational operations on large sets of data in which data path bottlenecks and the need for a highly specialized compiler are eliminated.

SUMMARY OF THE INVENTION

The present invention is a minimal instruction set computer architecture and multiple instruction issue method for processing multiple scalar instructions in parallel using a minimal instruction set. The computer architecture is referred to herein as a hyperscalar computer architecture. The hyperscalar computer architecture preferably comprises a central memory, an instruction buffer, a control unit, an I/O control unit, a plurality of functional units, a plurality of register files, and a data routing circuit. In the hyperscalar computer architecture, the central memory transfers a plurality of instructions to the instruction buffer. The control unit receives multiple instructions from the instruction buffer, and automatically determines a largest subset of instructions from those received that can be simultaneously issued to the plurality of functional units. The control unit then issues each instruction in the largest subset in parallel to an appropriate functional unit. Each functional unit receives data from and returns computational results to an associated register file. The data routing circuit serves to transfer data between each register file and any other register file, the central memory, the control unit, or the I/O control unit.

The preferred embodiment of the multiple instruction issue method comprises the steps of: determining a set of first source register files used by a plurality of instructions; determining a set of second source register files used by the plurality of instructions; determining a set of destination register files used by the plurality of instructions; determining a largest subset of instructions within the plurality of instructions that can be executed without a register file conflict; and issuing in parallel the instructions within the largest subset to a plurality of functional units.

DETAILED DESCRIPTION OF THE PREFERRED EMBODIMENTS

Figure 2:
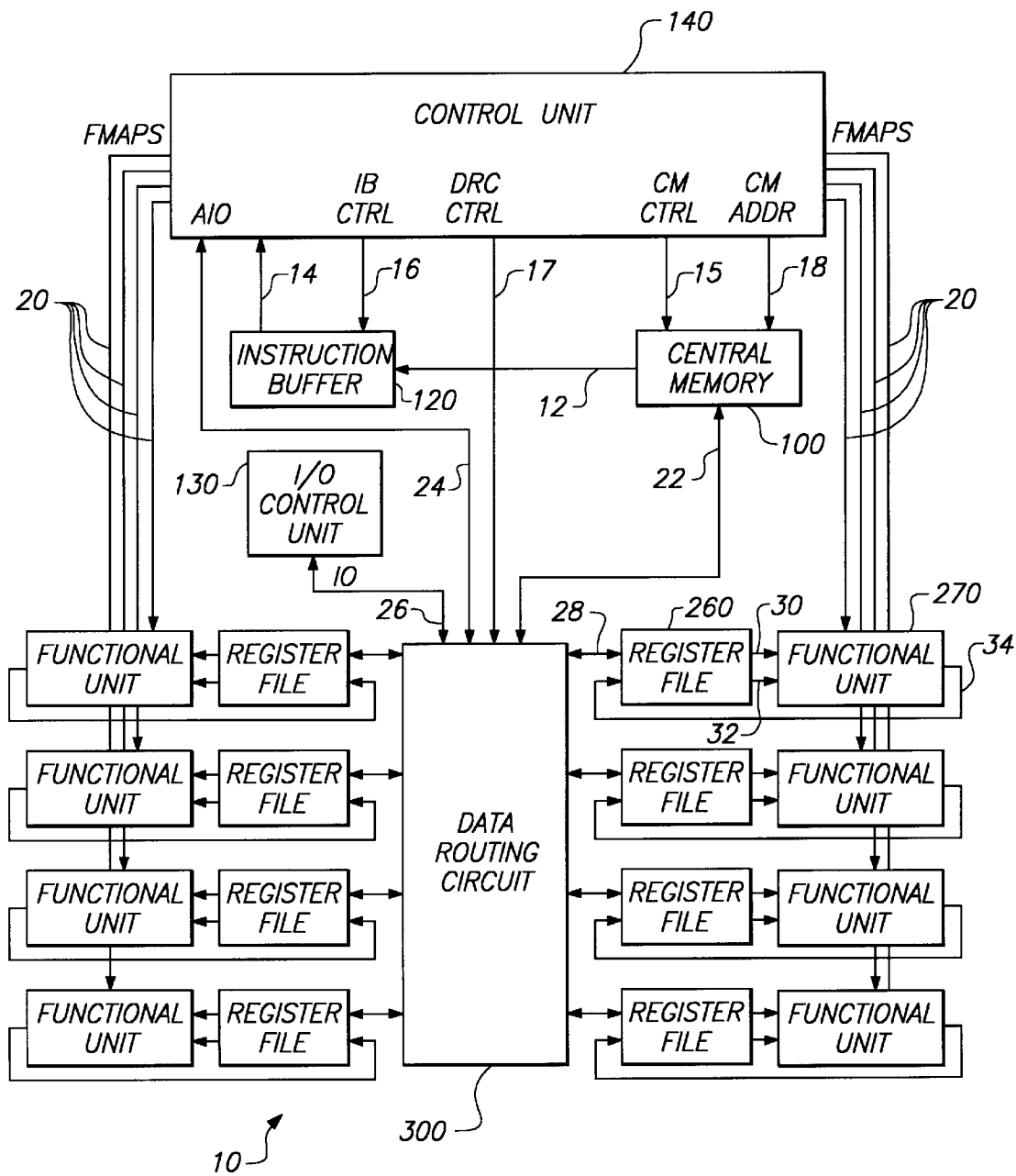
FIG. 2 is a block diagram of a preferred embodiment of a hyperscalar computer architecture constructed in accordance with the present invention.

Referring now to FIG. 2, a block diagram of a preferred embodiment of a hyperscalar computer architecture 10 constructed in accordance with the present invention is shown. The hyperscalar computer architecture 10 preferably comprises a central memory 100, an instruction buffer 120, a control unit 140, an I/O control unit 130, a plurality of functional units 270, a plurality of register files 260, and a data routing circuit 300. The instruction buffer 120 receives multiple instructions in parallel from the central memory 100. The control unit 140 in turn receives a plurality of instructions from the instruction buffer 120, and automatically determines the largest sequential number of instructions within the plurality of instructions received from the instruction buffer 120 that can be issued in parallel to the plurality of functional units 270. Since the control unit 140 automatically detects instruction sequences that can be processed in parallel, a specialized compiler for arranging serial instructions into parallel sequences is unnecessary. The data routing circuit 300 serves to transfer data to and from the central memory 100, the control unit 140, the I/O control unit 130, and each register file 260.

In the preferred embodiment of the present invention, the data word size is 64 bits. This data word size is a natural choice for image processing applications, since each pixel within an image can be represented by four 16-bit values corresponding to red, green, blue, and opacity values. The 64-bit word size is also a natural choice for document processing applications, since each pixel in a document can be represented by four 16-bit values corresponding to cyan, yellow, magenta, and black. The 64-bit data word size is also the natural data word size for performing double precision floating point operations.

The hyperscalar computer architecture 10 is a "three address" architecture, in that instructions specify a first location within a first source register file 260 from which to obtain data, a second location within a second source register file 260 from which to obtain data, and a third location in a result destination register file 260 at which to store the result of the operation performed by the instruction. Each instruction also specifies an opcode indicating the specific operation the instruction is to perform. Each instruction therefore can be represented as $I=(op(i,j,k))$, where "op" is the opcode, i identifies the result destination register file 260 and an address within the result destination register file 260; j identifies the first source register file 260 and an address within the first source register file 260; and k identifies the second source register file 260 and an address within the second source register file 260. In the preferred embodiment, the instruction word size is 32 bits.

The central memory 100 preferably comprises a plurality of interleaved memory banks having an instruction output, an address input, a control input, and a bi-directional data cluster port. Upon receiving an appropriate control signal at its control input, the central memory 100 transfers a first instruction group to the instruction output. In the preferred embodiment, the first instruction group size is 16 instructions. An address received at the address input specifies the starting address at which to begin a first instruction group transfer. The data cluster port comprises a number of data pathways equal to the number of register files 260, which in the preferred embodiment is eight. Each data pathway within the data cluster port has a width equal to the data word size, which in the preferred embodiment is 64 bits. Thus, in the preferred embodiment, the data cluster port is 8*64 or 512 bits wide. In an exemplary embodiment, the central memory 100 is 8 banks of interleaved 16 Mb DRAMs.

The instruction buffer 120 comprises a data storage means for receiving instruction groups from the central memory 100 and transferring an issue consideration group to the control unit 140. The instruction buffer 120 has an instruction input, an instruction output, and a control input. The instruction input of the instruction buffer 120 is coupled to the instruction output of the central memory 100 via a first instruction transfer path 12. In the preferred embodiment, the instruction buffer 120 stores up to 16 instruction groups of eight instructions received from the central memory 100, and transfers 8 instructions at a time to the control unit 140 in each issue consideration group.

The control unit 140 is a means for issuing multiple instructions in parallel to the plurality of functional units 270. The control unit 140 provides an instruction input, an IB control output, a CM control output, a DRC control output, a CM address output, a plurality of FMAP outputs, and an address I/O (AIO) port. The instruction input of the control unit 140 is coupled to the instruction output of the instruction buffer 120 by a second instruction transfer path 14. The IB control output of the control unit 140 is coupled to the instruction buffer's control input via a control line 16. An address line 18 couples the control unit's CM address output and the central memory's address input. A control line 15 couples the CM control output to the control input of the central memory 100. The control unit 140 directs the instruction buffer 120 to transfer the issue consideration group via the IB control output. Through the CM control output, the control unit 140 directs the central memory 100 to transfer one or more first instruction groups to the instruction buffer 120, where the starting address of the first instruction group is output at the control unit's CM address output. Upon receiving the instructions within the issue consideration group from the instruction buffer 120, the control unit 140 determines the largest subset of instructions within the issue consideration group that can be issued in parallel in a single clock cycle. The control unit 140 then issues each of the instructions within the largest subset to an appropriate functional unit 270 by directing a function map, or FMAP, to a corresponding FMAP output. Each FMAP contains an instruction opcode, addresses for obtaining a first source data value, a second source data value, and a result destination address. The control unit 140 maintains a current instruction pointer (CIP) indicating the address of the first instruction that has been issued to the plurality of functional units 270 at the outset of the current clock cycle; a current issue count signal Y that indicates the number of instructions issued at the outset of the current clock cycle; a next instruction pointer (NIP) that indicates the address of the first instruction to be issued to the plurality of functional units 270 in the next clock cycle; and a next issue count signal P that indicates the number of instructions to be issued at the outset of the next clock cycle.

Each functional unit 270 comprises a means for performing logical and arithmetic operations. Each functional unit 270 has a first input, a second input, an FMAP input, and an output. The FMAP input of each functional unit 270 is coupled to a corresponding FMAP output of the control unit 100 by an FMAP transfer path 20. Under the direction of the control unit 140, each functional unit 270 receives an FMAP corresponding to an instruction at its FMAP input. Each FMAP is obtained from a portion of an instruction and indicates the address of a first data item in the first source register file 260, the address of a second data item in the second source register file 260, an opcode corresponding to the operation to be performed on the first and second data items respectively stored at the first and second source register file 260 addresses, and an address in the result destination register file 260 at which to store the result of the operation. The opcode within the FMAP indicates the address of a microprogram that is executed by the functional unit 270 to carry out the actions necessary to implement the instruction.

Each register file 260 comprises a data storage means for storing a plurality of data words. Each register file 260 has a first input, a second input, and a first output, and a second output. The first and second outputs of each register file 260 are coupled to the first and second inputs of a corresponding functional unit 270 via a first data line 30 and a second data line 32, respectively. The second input of each register file 260 is coupled to the output of its corresponding functional unit 270 via a result line 34, and therefore, receives the result of an operation performed by its corresponding functional unit 270 at the end of the current clock cycle. In the preferred embodiment, each register file 260 stores 64 data words.

The I/O controller 130 comprises a means for exchanging control data words with the control unit 140 via the data routing circuit 300 having a bi-directional I/O (IO) port. The I/O controller 130 directs control data words to the control unit 140 that indicate run continuously, run single step, and halt-modes of operation.

The data routing circuit 300 comprises a means for selectively routing data between a given register file 260 and any other register file 260, the central memory 100, the control unit 140, or the I/O control unit 130. The data routing circuit 300 has a control input, a bi-directional data cluster port, a bi-directional AIO port, a bi-directional IO port, and a plurality of bi-directional data word ports. The control input of the data routing circuit 300 is coupled to the DRC control output of the control unit 140 by a control signal bus 17. The data routing circuit's data cluster port is coupled to the central memory's data cluster port by a cluster bus 22. Each data word port is coupled to the first input of a respective register file 260 by a data word bus 28. The AIO port of the data routing circuit 300 is coupled to the AIO port of the control unit 140 by an AIO bus 24, and the data routing circuit's IO port is coupled to the IO port of the I/O control unit 130 by a IO bus 26. The cluster bus 22 comprises a number of data pathways equal to the number of register files 260 present in the hyperscalar computer architecture 10, where each data pathway is one data word wide. Since each data pathway carries a data word, the signal present on the cluster bus 22 is a data word cluster. In the preferred embodiment, the cluster bus 22 is eight 64-bit data pathways, having a total width of 512 bits. The data routing circuit 300 allows each data pathway within the cluster bus 22 to be routed to a unique register file 260. Thus, if a data word is present on each of the data pathways, each data word can be routed to a unique register file 260 or to a unique location in central memory 100. Moreover, a data word can be routed between any register file 260 and the AIO port of the control unit 140 or the IO port of the I/O controller 130. The specific routing performed by the data routing circuit 300 is determined by a signal received at the data routing circuit's control input via the control signal bus 17.

The hyperscalar computer architecture 10 is a scalable computer architecture in that the maximum number of instructions that can be issued in parallel is given by a scaling parameter K, where K equals $2^M$. The scaling parameter is chosen based upon the hardware resources available. Since the scaling parameter K determines the maximum number of instructions that can be issued in parallel, it also determines the number of functional units 270 that must be present, which in turn determines the number of register files 260 that are required. To allow parallel transfer of data between the plurality of register files 260 and the central memory 100, the number of data word buses 28 must match the number of register files 260, and the cluster bus 22 must have a width equal to the number of register files 260 times the data word size.

The choice of scaling parameter also determines the number of bits required in an instruction to uniquely specify the first source register file 260, the second source register file 260, and the result destination register file 260. The choice of scaling parameter therefore also determines the number of bits within an instruction that are available to specify the instruction opcode and the unique addresses of the first data item, the second data item, and the instruction result within the first source, the second source, and the result destination register files 260, respectively.

In the preferred embodiment of the present invention, the scaling parameter is 8. Therefore, up to eight instructions can be issued by the control unit 140 in parallel to a total of eight functional units 270. Eight register files 260, each register file 260 corresponding to a functional unit 270, are present. Eight data word buses 28 couple each register file 260 to the data routing circuit 300, and the cluster bus 22 is eight data words or 512 bits wide. Within each 32-bit instruction, three bits are required to indicate the first source register file 260, three bits are required to indicate the second source register file 260, and three bits are required to indicate the result destination register file 260. Thus, a total of 9 instruction bits are required to identify the register files 260 indicated in the instruction as a result of the scaling parameter having the value 8.

Since each register file 260 in the preferred embodiment can store a total of 64 data words, each instruction requires 6 bits to indicate a specific address within each of the first source, second source, and result destination register files 260. Therefore, a total of 18 instruction bits are required to indicate register file addresses. The 9 instruction bits required to identify the first source, the second source, and the result destination register files 260 plus the 18 instruction bits required to identify addresses within each of these register files 260 leaves 5 instruction bits available to specify an instruction opcode within the 32-bit instruction size of the preferred embodiment. This in turn means that a total of 32 instructions are supported in the hyperscalar computer architecture's instruction set. Generally, commercially available RISC instruction sets comprise a variable number of instructions, depending upon the particular RISC architecture. However, some RISC instruction sets comprise more than one hundred instructions. The hyperscalar computer architecture 10 is therefore a minimal instruction set computing (MISC) architecture. The instruction set for the preferred embodiment 10 of the hyperscalar computer architecture is given in Appendix A.

Figure 3:
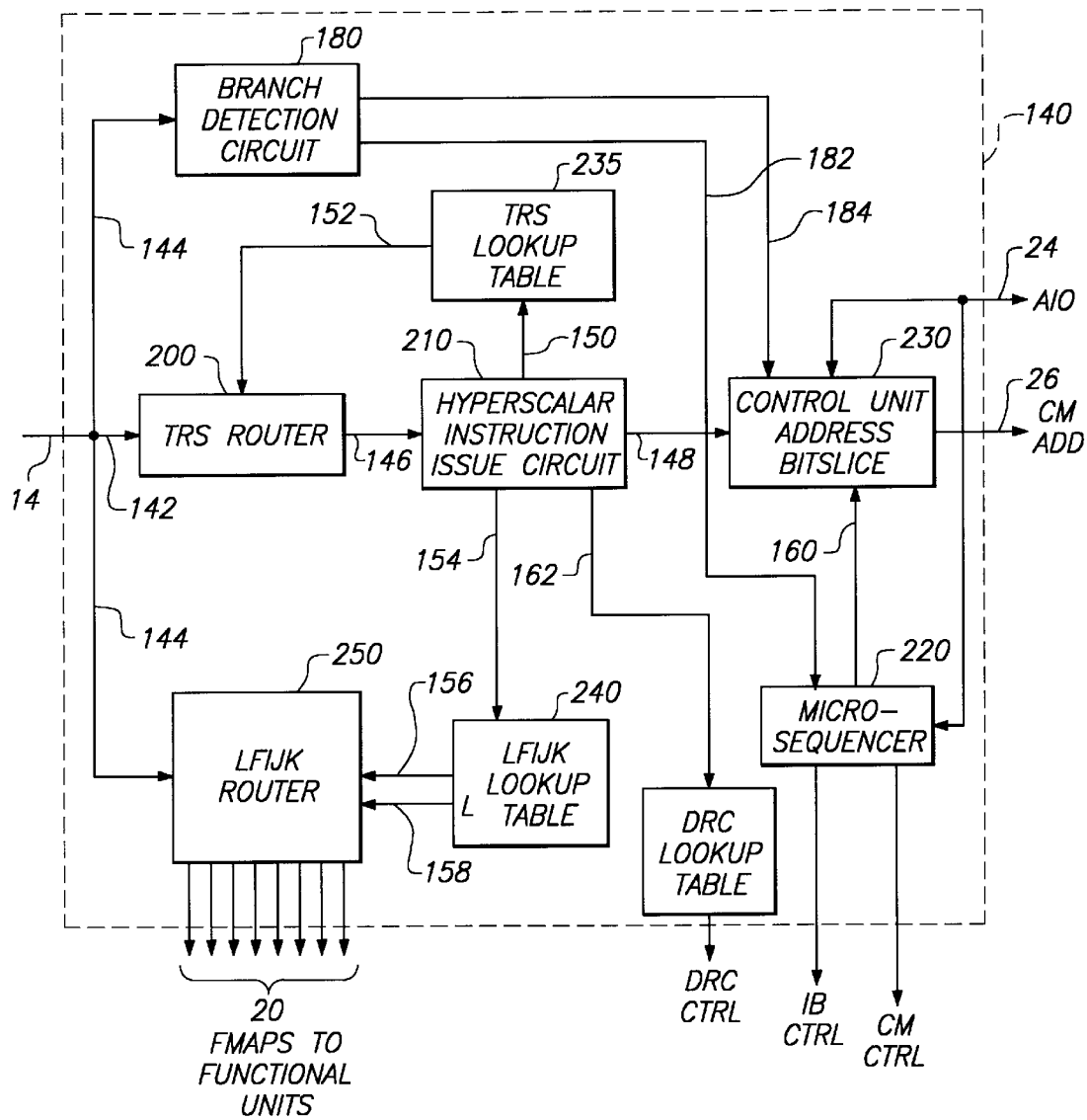
FIG. 3 is a block diagram of a preferred embodiment of a control unit of the present invention.

Referring now to FIG. 3, a block diagram of a preferred embodiment of the control unit 140 is shown. The control unit 140 comprises a TRS router 200, a hyperscalar instruction issue circuit 210, a microsequencer 220, a TRS lookup table 235, an LFIJK lookup table 240, a DRC lookup table 240, a control unit address bitslice 230, an LFIJK router 250, and a branch detection circuit 180. The control unit 140 receives the issue consideration group from the instruction buffer 130 via its instruction input, where the number of instructions within the issue consideration group is equal to the scaling parameter. Once the issue consideration group has been routed into the control unit 140, a first subset of bits within each instruction comprising the issue consideration group are routed via a first TRS bus 142 to form a TRS bit array, and a second subset of bits within each instruction are routed via an FIJK bus 144 to form an FIJK bit array.

In the representation of each instruction as I=(op(i,j,k)), the instruction bits within i, j, and k indicate the result destination register file 260 and an address within the result destination register file 260; the first source register file 260 and an address within the first source register file 260; and the second source register file 260 and an address within the second source register file 260, respectively. The number of register files 260 present is given by the scaling parameter K, where K equals $2^M$. Therefore, M bits are required within each of i, j, and k to specify a particular register file 260. Herein, the M bits within i are labeled as T, the M bits within j are labeled as R, and the M bits within k are labeled as S. Thus, within each instruction, R indicates the first source register file 260, S indicates the second source register file 260, and T indicates the result destination register file 260. Therefore, the register files 260 indicated by each instruction in the issue consideration group are given by a bit vector $T_v R_v S_v$, where v ranges from 0 to ($2^M-1$). The TRS bit array is therefore formed from the bit vector $T_v R_v S_v$ created from each instruction within the issue consideration group.

Within the control unit 140, the TRS bit array is used to determine the largest sequential number of instructions from within the issue consideration group that can be issued simultaneously. This number is determined in relation to a first parallel issue constraint and a second parallel issue constraint. The first parallel issue constraint is that the first data item and the second data item must be stored within the register file 260 that is to receive the instruction result. This is required because each functional unit 270 operates on data that is stored within its corresponding register file 260, and returns a result to its corresponding register file 260 upon completion of the operation. If the first data item or the second data item are not stored within the result destination register file 260, a data transfer operation from the first source register file 260 and/or a data transfer from the second source register file 260 to the result destination register file 260 are/is required. This data transfer operation must occur through the data routing circuit 300. Since instructions are issued in parallel, but program serialism must be maintained for the coherency in register side-effecting, a data transfer operation precludes the use of the functional units 270 corresponding to the register files 260 involved in the data transfer operation until the transfer operation has been completed.

The second parallel issue constraint that must be satisfied for two or more instructions to be issued in parallel is that each instruction issued must specify a unique result destination register file 260 to avoid a register file usage conflict. For example, if the first instruction within the issue consideration group specifies a data transfer operation to a given register file 260, and the fifth instruction within the issue consideration group indicates that the same register file 260 is to be the recipient of a result generated by its corresponding functional unit 270, the first instruction and the fifth instruction cannot be issued in parallel.

The control unit 140 creates the TRS bit array from the issue consideration group, and determines the largest sequential number of instructions within the issue consideration group that simultaneously satisfy the first and second parallel issue constraints described above. This number is henceforth referred to as the next issue count value or P. Once P has been determined, each of the v=0 through v=P instructions are issued in parallel to an appropriate functional unit 270.

The FIJK bit array is created from those instruction bits that are not used in creating the TRS bit array. In a manner similar to the TRS bit array, the FIJK bit array is created from a plurality of $F_v I_v J_v K_v$ bit vectors, where v ranges from 0 to ($2^M-1$). Within the FIJK bit array, each $F_v$ indicates the opcode for instruction v; each $I_v$ indicates the address within the result destination register file 260 for instruction v; each $J_v$ indicates the address of the data item within the first source register file 260 for instruction v; and each $K_v$ indicates the address of the data item within the second source register file 260 for instruction v. Each $F_v I_v J_v K_v$ bit vector is a portion of an FMAP that is routed to one of the functional units 270, indicating the operation to be performed, the addresses of the data items upon which to operate, and the address at which the result of the operation is to be stored.

The TRS router 200 comprises a barrel shifter having an input, a control input, and an output. The input of the TRS router is coupled to the first TRS bus 142. The number of instructions P that are issued in a single clock cycle can range from 1 to $2^M$. When P is less than $2^M$, the TRS router 200 ensures that instructions (P+1) through $2^M$ within the current issue consideration group are routed into the v=0 through v=$(2^M-(P+1))$ bit vector positions in the TRS bit array created from the next issue consideration group received from the instruction buffer 120. The TRS router 200 receives a TRS bit array at its input, and orders the TRS bit array such that each $T_v R_v S_v$ bit vector is routed into a fixed sequential position at its output. In the preferred embodiment, the $T_0 R_0 S_0$ bit vector is left justified.

The TRS lookup table 235 comprises a ROM having an input and an output. The output of the TRS lookup table 235 is coupled to the control input of the TRS router 200 via a first routing line 152. Under the direction of a signal received at its input, the TRS lookup table 235 issues a routing signal to the TRS router 200 indicating the routing required to arrange each $T_v R_v S_v$ bit vector of the TRS bit array into its fixed sequential position.

The DRC lookup table 245 comprises a ROM having an input and an output. The output of the DRC lookup table 245 forms the control unit's DRC control output. Under the direction of a signal received at its input, the DRC lookup table 245 produces a routing signal to the data routing circuit 300 indicating the routing the data routing circuit 300 is to apply to one or more data words.

The hyperscalar instruction issue circuit 210 comprises a parallel issue determination means having a TRS input, an issue count output, a TRS lookup output, an LFIJK lookup output, and a DRC lookup output. The TRS input of the hyperscalar instruction issue circuit 210 is coupled to the output of the TRS router 200 via a second TRS bus 146. The TRS lookup output is coupled to the input of the TRS lookup table 235 via a first lookup line 150, and the DRC lookup output is coupled to the input of the DRC lookup table 245 via a second lookup line 162. The TRS input receives the ordered TRS bit array from the TRS router 200 via the second TRS bus, and determines the value of P indicating the largest sequential number of instructions within the next issue consideration group that can be issued in a single clock cycle. The value of P is output at the issue count output. The hyperscalar instruction issue circuit 210 also supplies a TRS lookup signal, an LFIJK lookup signal, and a DRC lookup signal at its TRS lookup output, LFIJK lookup output, and DRC lookup output, respectively. The TRS lookup signal indicates to the TRS router 200 the manner in which the ordering of each $T_v R_v S_v$ bit vector is to occur. Similarly, the LFIJK lookup signal indicates the manner in which each $F_v I_v J_v K_v$ bit vector is to be ordered. The DRC lookup signal indicates the routing that data words are to receive within the data routing circuit 300.

The control unit address bitslice 230 comprises a plurality of registers and an adder having a control input, an input, a branch condition input, an output, and a bi-directional data port. The input of the control unit address bitslice 230 is coupled to the issue count output of the hyperscalar instruction issue circuit 210 via an issue count line 148, and therefore receives the next issue count P. The control unit address bitslice 230 uses the next issue count P to maintain the next instruction pointer, the current instruction pointer, and the previous issue count. The output of the control unit address bitslice 230 forms the control unit's CM address output, and routes the value of the next instruction pointer to the central memory 100. The data port forms the AIO port of the control unit 140. A data word present on the AIO bus 24 is loaded into the control unit address bitslice 230 when an appropriate signal is received at its control input. A branch condition signal present at the branch condition input of the control unit address bitslice 230 indicates that a branch has been detected, and also indicates the operations the control unit address bitslice 230 must perform to test a condition associated with the branch. The branch condition signal causes the loading and testing of a branch condition value present on the AIO bus 24. Following the loading of the branch condition value, the control unit address bitslice 230 determines if the branch condition value satisfies the branch condition.

The control unit microsequencer 220 is a state machine that generates the control signals required to specify the operations performed by the instruction buffer 130, the central memory 100, and the control unit address bitslice 230. In addition, the control unit microsequencer 220 directs the actions of the control unit address bitslice 230 when a branch has occurred. The control unit microsequencer 220 has an external FMAP input, a first control output, a second control output, a third control output, and a branch input. The first control output of the control unit microsequencer 220 forms the control circuit's IB control output, and the second control output forms the control circuit's CM control output. The microsequencer's third control output is coupled to the control input of the control unit address bitslice 230 by a control line 160. In the presence of a second branch signal received at its branch input, the microsequencer 220 directs the operations of the control unit address bitslice 230 required in the branch.

The LFIJK lookup table 240 comprises a ROM having an input, an output, and an L code output. The input of the LFIJK lookup table 235 is coupled to the LFIJK lookup output of the hyperscalar instruction issue circuit via a third lookup line 152. Under the direction of a signal received at its input, the LFIJK lookup table 240 issues a routing signal to the LFIJK router 250 indicating the routing required to arrange each $F_v RI_v J_v K_v$ bit vector of the FIJK bit array into a fixed position. In addition, the LFIJK lookup table 240 generates an L-value at its L code output corresponding to each functional unit 270. A given L-value indicates whether the corresponding functional unit 20 is to load the $F_v I_v J_v K_v$ bit vector that has been routed to it. The set of L values corresponds to an L code. In the preferred embodiment, each L value is a single-bit value, and a total of eight L values are within the L code.

The LFIJK router 250 comprises a monodirectional switch array having a first input, a routing control input, a second input, and a plurality of FMAP outputs. The first input of the LFIJK router 250 is coupled to the FIJK bus 144, and therefore receives the FIJK bit array created from the issue consideration group. The second input of the LFIJK router 250 is coupled to the L-code output of the LFIJK lookup table via an L-code line 158, and therefore receives the plurality of L values generated by the control unit microsequencer 220. The routing control input is coupled to the output of the LFIJK lookup table 240, and therefore receives the routing signal output by the LFIJK lookup table 240. The routing signal indicates the ordering each $F_vI_vJ_vK_v$ bit vector must receive prior to appearing at a corresponding FMAP output. The plurality of FMAP outputs of the LFIJK router 250 form the control unit's plurality of FMAP outputs. Based upon the routing signal received at its routing control input, the LFIJK router 250 routes each $F_vI_vJ_vK_v$ bit vector in the FIJK bit array to an appropriate FMAP output, where each FMAP output corresponds to a predetermined functional unit 270. Since each L value received at the LFIJK router's second input corresponds to a predetermined functional unit 270, each L value is routed to a corresponding FMAP output. Each FMAP that appears at an FMAP output is therefore formed from one of the $F_vI_vJ_vK_v$ bit vectors and an L value. In the preferred embodiment, the LFIJK router is equivalent to a portion of the data routing circuit 300, which is described in detail below.

The branch detection circuit 180 comprises a decoding means for determining if an instruction corresponding to a branch is within the issue consideration group, and has an input, a branch condition output, and a branch output. The input of the branch detection circuit 180 is coupled to the FIJK bus 144. The branch condition output of the branch detection circuit 180 is coupled to the branch condition input of the control unit address bitslice 230 via a branch condition line 184. The branch output of the branch detection circuit is coupled to the branch input of the microsequencer 220 via a branch line 182. The branch detection circuit 180 decodes the F values present within the FIJK bit array. If an F value corresponding to a branch is detected, the branch detection circuit 180 outputs a branch condition signal to the control unit address bitslice 230, and a branch signal to the microsequencer 220. In a branch instruction I=(op,(i,j,k)), the i portion of the instruction is used to indicate a register file address, the contents of which has a value to be tested for a given condition depending upon the instruction opcode. The branch detection circuit 180 includes in the branch condition signal the particular test that is required.

Figure 1:
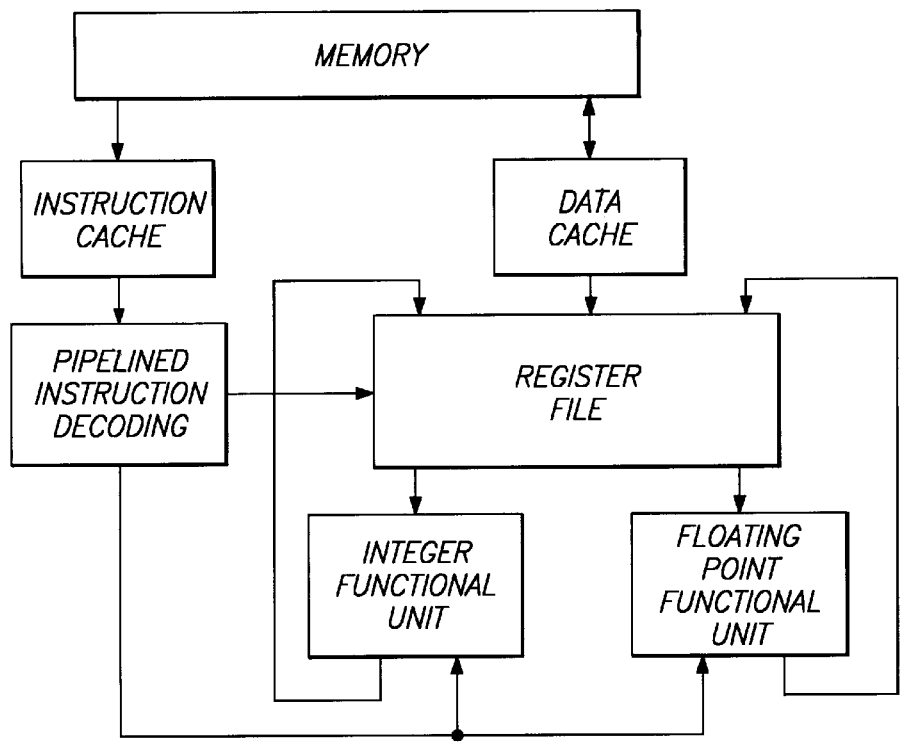
FIG. 1 is a block diagram of a prior art RISC computer architecture.
Figure 4:
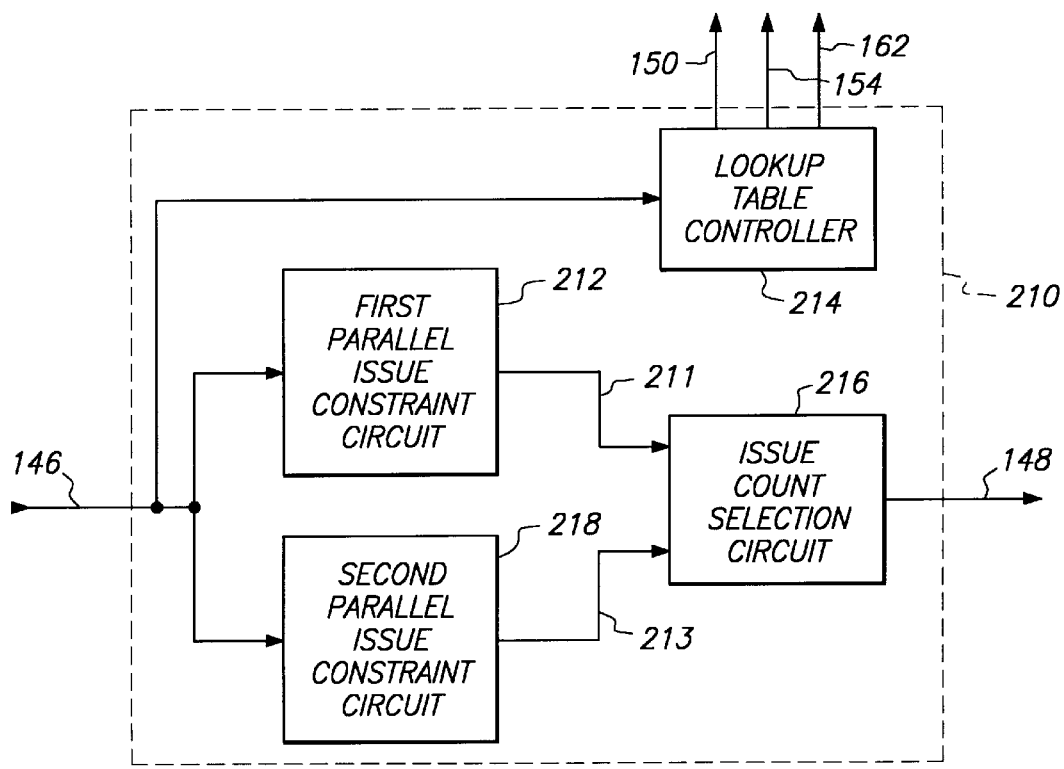
FIG. 4 is a block diagram of a preferred embodiment of a hyperscalar instruction issue circuit.

Referring now to FIG. 4, a block diagram of a preferred embodiment of the hyperscalar instruction issue circuit 210 is shown. The hyperscalar instruction issue circuit comprises a first parallel issue constraint circuit 212; a second parallel issue constraint circuit 218; an issue count selection circuit 216; and a lookup table controller 214. The lookup table controller 214 has a first input, a first routing output, a second routing output, and a third routing output. The input of the lookup table controller 214 is coupled to the second TRS bus 146. The first routing output of the lookup table controller forms the TRS output of the hyperscalar instruction issue circuit 210 on line 152. The second routing output of the lookup table controller 214 forms the LFIJK output of the hyperscalar instruction issue circuit 210 on line 154, and the third routing output of the lookup table controller forms the hyperscalar instruction issue circuit's DRC output on line 162. Upon receiving the TRS bit array at its input, the lookup table controller 214 generates a first routing signal at its first routing output, a second routing signal at its second routing output, and a third routing signal at its third routing output. The first, second, and third routing signals indicate an appropriate location within the TRS lookup table, the LFIJK lookup table, and the DRC lookup table at which a TRS routing control signal, an LFIJK routing control signal, and a DRC routing control signal corresponding to the TRS bit array received is stored, respectively.

The first parallel issue constraint circuit 212 and the second parallel issue constraint circuit 218 each have a respective input and a respective output. The input of the first parallel issue constraint circuit 212 and the input of the second parallel issue constraint circuit 218 are coupled to the second TRS bus 146. The issue count selection circuit 216 has a first input, a second input, and an output. The first input of the issue count selection circuit 216 is coupled to the output of the first parallel issue constraint circuit 212, and the second input of the issue count selection circuit 216 is coupled to the output of the second parallel issue constraint circuit 218. The output of the issue count selection circuit is coupled to the issue count line 148. The first parallel issue constraint circuit 212 produces a first issue count at its output that indicates the largest sequential number of instructions that satisfy the first parallel issue constraint, namely, that the result destination register of each instruction that is issued in parallel must be unique. The second parallel issue constraint circuit 218 produces a second issue count at its output that indicates the largest sequential number of instructions that satisfy the second parallel issue constraint. The second parallel issue constraint is that for a given bit vector $T_vR_vS_v$, a register file conflict exists if $R_v$ does not equal $T_v$ or if $S_v$ does not equal $T_v$. In such cases, either the first data item or the second data item must be retrieved from a register file 260 other than the result destination register file 260. The issue count selection circuit 216 outputs the smaller of the first issue count and the second issue count as the next issue number P.

Figure 10A:
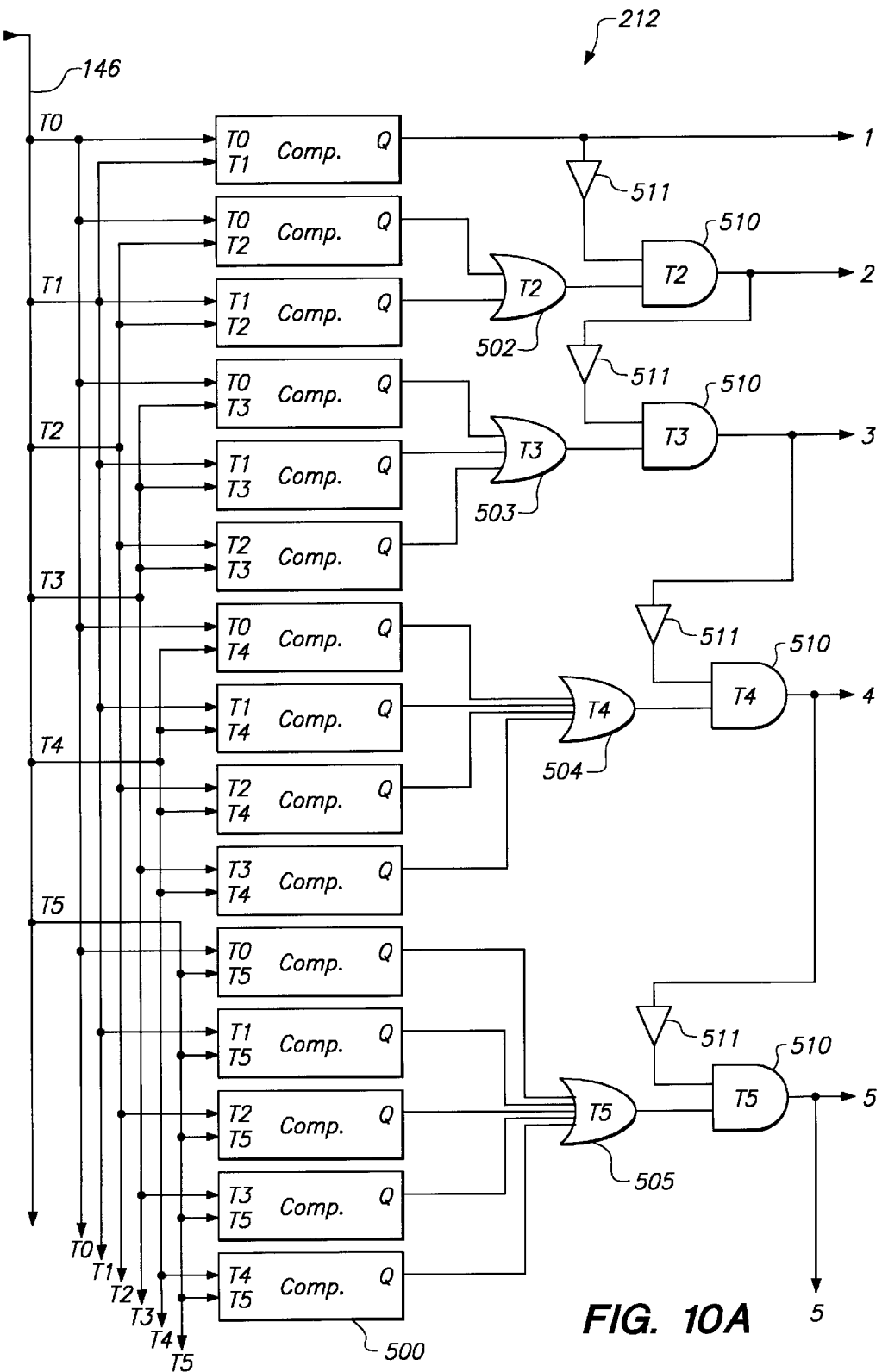
FIGS. 10A, 10B, and 10C are block diagrams of a preferred embodiment of a first parallel issue constraint circuit constructed according to the present invention.
Figure 10B:
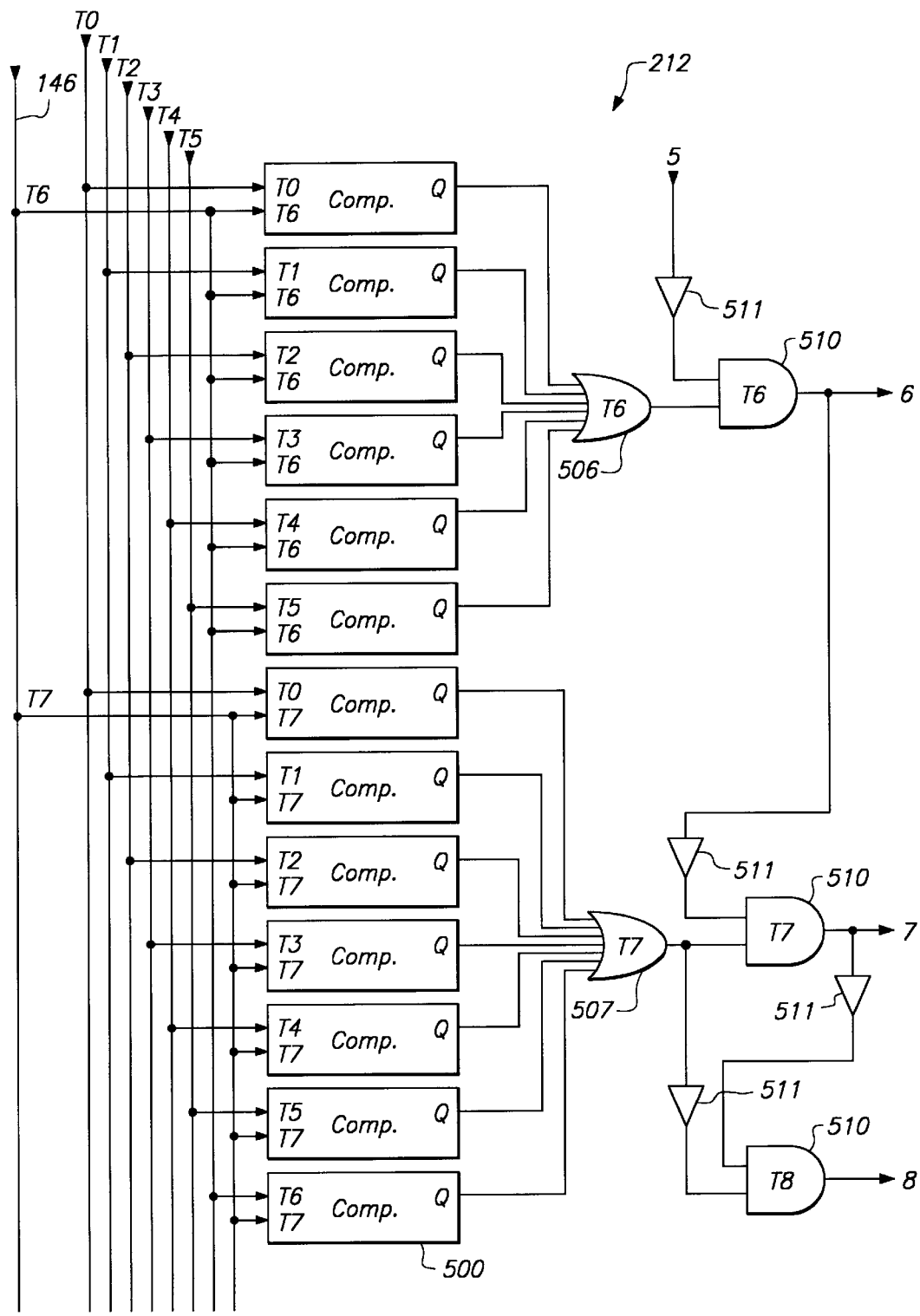
Figure 10C:
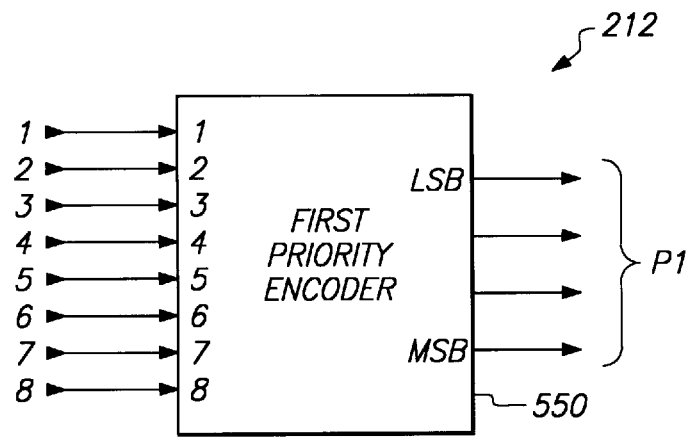

Referring now to FIGS. 10A, 10B, and 10C, a block diagram of a preferred embodiment of the first parallel issue constraint circuit 212 is shown. The first parallel issue constraint circuit 212 comprises a plurality of comparators 500, a plurality of OR gates 502, 503, 504, 505, 506, 507, a plurality of AND gates 510, a plurality of inverters 511, and a first priority encoder 550. Each comparator 500 has a first input, a second input, and an output. To satisfy the first parallel issue constraint, result destination register file 260 conflicts must be detected between each $T_v$ within the TRS bit array and $T_{v-1}, T_{v-2}, T_{v-3}$, and so on to $T_0$. Thus, each $T_v$ is compared with $T_{v-1}, T_{v-2}, T_{v-3}$, and so on to $T_0$, beginning with $T_1$. Therefore, for each given $T_v$, where v>0, there are v comparisons required, necessitating the use of v comparators 500. In the preferred embodiment, v ranges from 0 to 7. Hence, in the preferred embodiment, seven comparators 500 are required to compare $T_7$ to $T_0$ through $T_6$ to indicate a $T_7$ conflict; six comparators 500 are required to compare $T_6$ to $T_0$ through $T_5$ to indicate a $T_6$ conflict; five comparators 500 are required to compare $T_5$ to $T_0$ through $T_4$ to indicate a $T_5$ conflict; four comparators 500 to compare $T_4$ to $T_0$ through $T_3$ to indicate a $T_4$ conflict; three comparators 500 are required to compare $T_3$ to $T_2, T_1$, and $T_0$ to indicate a $T_3$ conflict; two comparators 500 are required to compare $T_2$ to $T_1$ and $T_0$ to indicate a $T_2$ conflict; and a single comparator 500 is required to compare $T_1$ to $T_0$ to indicate a $T_1$ conflict. In the preferred embodiment, a total of 28 comparators 500 are required.

The first inputs of the seven comparators 500 used in the $T_7$ conflict comparisons are coupled to the second TRS bus 146 such that each of the first inputs receive $T_7$. The second inputs of the seven comparators 500 used in the $T_7$ conflict comparisons are coupled to the second TRS bus 146 such that each of the second inputs successively receives $T_0$ through $T_6$. In like manner, the first inputs of the six comparators 500 used in the $T_6$ conflict comparisons are coupled to the second TRS bus 146 such that each of the first inputs receive $T_6$. The second inputs of the six comparators 500 used in the $T_6$ conflict comparisons are coupled to the second TRS bus 146 such that each of the second inputs successively receives $T_0$ through $T_5$. The couplings for the first and second inputs for the comparators used in the remaining conflict comparisons are coupled to the second TRS bus 146 in a similar manner that is readily apparent to those skilled in the art.

Within the plurality of OR gates 502, 503, 504, 505, 506, 507, there is an OR gate associated with each $T_v$ comparison having v inputs and an output. For example, the output of each comparator 500 used in the $T_7$ conflict comparisons is coupled to a corresponding input of a $T_7$ OR gate 507. Similarly, the output of each comparator 500 used in the $T_6$ conflict comparisons is coupled to a corresponding input of a $T_6$ OR gate 506, and so on in a similar manner for a $T_5$ OR gate 503, a $T_4$ OR gate 504, a $T_3$ OR gate 503, and a $T_2$ OR gate 502. Those skilled in the art will recognize that a $T_1$ OR gate is not necessary because the $T_1$ conflict comparison requires only one comparator. A high signal value present at the output of any OR gate within the plurality of OR gates 502, 503, 504, 505, 506, 507 indicates that a result destination register file conflict has occurred.

From the plurality of AND gates 510 and the plurality of inverters 511, one AND gate 510 and one inverter 511 corresponds to each value of v greater than one. Each AND gate 510 has a first input and a second input, and each inverter 511 has an input and an output. The first input of each AND gate 510 is coupled to the output of a corresponding OR gate 502, 503, 504, 505, 506, 507. The second input of each AND gate 510 is coupled to the output of a corresponding inverter 511. For a given value of v, where v>1, the input of the inverter 511 corresponding to v is coupled to the output of the AND gate 510 corresponding to (v−1). Since no AND gate 510 corresponding to v=1 is present, the input of the inverter 511 corresponding to v=2 is coupled to the output of the $T_1$ conflict comparator. Moreover, the final determination of whether eight instructions can be performed is determined by logically combining the inverted output of the $T_7$ OR gate 507 with the inverted output of the $T_7$ AND gate 510 using an AND operation. If a multiple result destination register file 260 or $T_v$ conflicts exist, the result destination register file 260 conflict associated with the smallest v determines how many instructions satisfying the first parallel issue constraint can be issued in parallel. In the presence of multiple $T_v$ conflicts, the output of the AND gate 510 corresponding to the smallest value of v for which a conflict has been detected indicates a conflict while the other AND gate outputs do not indicate a conflict.

The first priority encoder 550 is an encoder having a plurality of inputs and a plurality of outputs. The plurality of first priority encoder inputs comprises an input corresponding to each value of v. Each input of the first priority encoder 550 is coupled to the output of the AND gate 510 associated with the identical value of v. Since no AND gate 510 is present corresponding to v=1, the first priority encoder's input corresponding to v=1 is coupled to the output of the $T_1$ conflict comparator 500. When a given AND gate output indicates that a conflict has been detected, the first priority encoder 550 outputs a binary value at its plurality of outputs equal to v; this value of v is the first issue count, indicating the number of sequential instructions that satisfy the first parallel issue constraint. In the preferred embodiment, the largest value of v is 8. Since four bits are required to represent the value 8, the plurality of first priority encoder outputs comprises four outputs. For example, if the output of the AND gate 510 corresponding to v=5 indicates that a $T_5$ conflict has been detected, the first priority encoder 550 outputs the value 0101. In this case, 5 sequential instructions satisfy the first parallel issue constraint.

Figure 11:
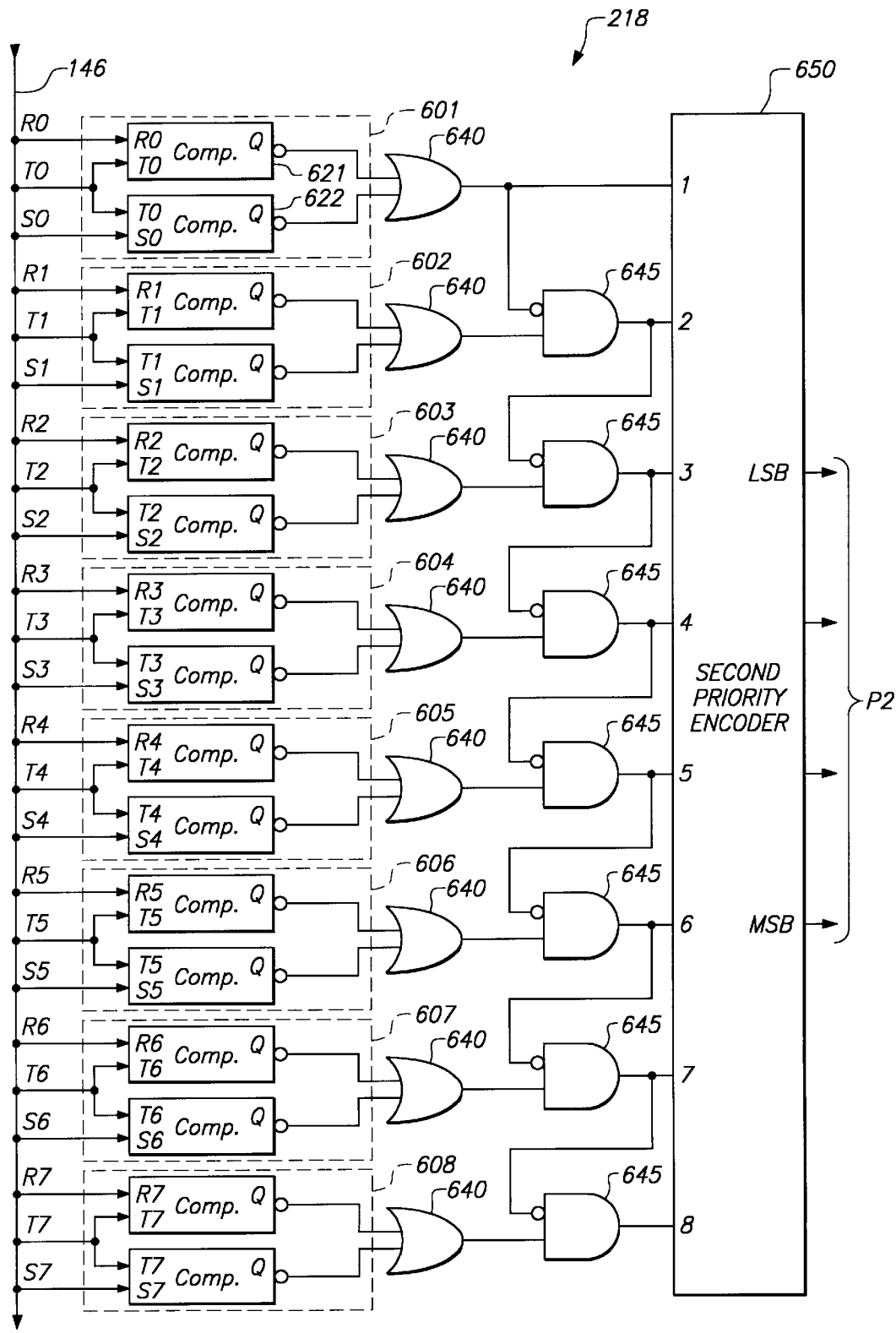
FIG. 11 is a block diagram of a preferred embodiment of a second parallel issue constraint circuit constructed according to the present invention.

Referring now to FIG. 11, a preferred embodiment of the second parallel issue constraint circuit 218 is shown. The second parallel issue constraint circuit 218 comprises a plurality of comparator sets 601, 602, 603, 604, 605, 606, 607, 608, a plurality of OR gates 640, a plurality of AND gates 645, and a second priority encoder 650. To satisfy the second parallel issue constraint, the values of $R_v$, $S_v$, and $T_v$ in each $T_v R_v S_v$ bit vector must be equal. In the preferred embodiment, v ranges from 0 to 7. Therefore, a first comparator set 601 within the plurality of comparator sets 601, 602, 603, 604, 605, 606, 607, 608 serves to compare $R_0$, $S_0$, and $T_0$; a second comparator set 602 serves to compare $R_1$, $S_1$, and $T_1$; a third comparator set 603 serves to compare $R_2$, $S_2$, and $T_2$; a fourth comparator set 604 serves to compare $R_3$, $S_3$, and $T_3$; a fifth comparator set 605 serves to compare $R_4$, $S_4$, and $T_4$; a sixth comparator set 606 serves to compare $R_5$, $S_5$, and $T_5$; a seventh comparator set 607 serves to compare $R_6$, $S_6$, and $T_6$, and an eighth comparator set 608 serves to compare $R_7$, $S_7$, and $T_7$. Each comparator set 601, 602, 603, 604, 605, 606, 607, 608 has a first input, a second input, a third input, a first output, and a second output. The first, second, and third inputs of the first comparator set 601 are coupled to the second TRS bus 146 such that they receive $T_0$, $R_0$, and $S_0$, respectively. The first, second, and third inputs of the second comparator set 602 are coupled to the second TRS bus 146 such that they receive $T_1$, $R_1$, and $S_1$, respectively. Those skilled in the art will recognize that the first, second, and third inputs of the third through eighth comparator sets 603, 604, 605, 606, 607, 608 are coupled to the second TRS bus 146 in an analogous manner.

Each comparator set 601, 602, 603, 604, 605, 606, 607, 608 comprises a first comparator 621 and a second comparator 622. The first and second comparators 621, 622 have a first input, a second input, and an output. For each comparator set 601, 602, 603, 604, 605, 606, 607, 608, the first input of the first comparator 621 forms its respective comparator set's first input, and the first input of the second comparator 622 is coupled to the first input of the first comparator 621. Therefore, the first input of the first comparator 621 and the first input of the second comparator 622 each receive a given $T_v$. For each comparator set 601, 602, 603, 604, 605, 606, 607, 608, the second input of the first comparator 621 forms its respective comparator set's second input, and the second input of the second comparator 622 forms its respective comparator set's third input. Therefore, the second input of the first comparator 621 receives a given $R_v$, and the second input of the second comparator 622 receives a given $S_v$. The output of the first comparator 621 forms its comparator set's respective first output, and the output of the second comparator 622 forms its respective comparator set's second output.

Within the first comparator set 601, the first comparator determines if a register file conflict exists between the result destination register file $T_1$ and the first source register file $R_1$. In like manner, the second comparator within the first comparator set 601 determines if a register file 260 conflict exists between the result destination register file $T_1$ and the second source register file $S_1$. The outputs of the first and second comparators 621, 622 are asserted in an inverted state. Thus, if the first comparator 621 has determined that a register file 260 conflict exists, the signal appearing at the first comparator set's first output will have a high value. Similarly, the signal appearing at the first comparator set's second output will have a high value if the second comparator 622 has determined that a register file conflict exists. The first and second comparators 621, 622 within the second through eighth comparator sets 602, 603, 604, 605, 606, 607, 608 function in an analogous manner.

The plurality of OR gates 640 in the second parallel issue constraint circuit 218 are each associated with a comparator set 601, 602, 603, 604, 605, 606, 607, 608. Therefore, in the preferred embodiment, eight OR gates 640 are present. Each OR gate 640 has a first input, a second input, and an output. The first input of each OR gate 640 is coupled to its respective comparator set's first output, and the second input of each OR gate 640 is coupled to its respective comparator's second output. If a register file conflict has been indicated by the first comparator 621 or the second comparator 622 within a given comparator set 601, 602, 603, 604, 604, 606, 607, 608, the associated OR gate 640 outputs a signal having a high value at its output.

The plurality of AND gates 645 comprises an AND gate 645 corresponding to comparator sets two through eight 602, 603, 604, 605, 606, 607, 608. Thus, in the preferred embodiment, seven AND gates 645 are present. Each AND gate 645 has a first input, a second input, and an output. For the AND gate 645 associated with the eighth comparator set 602, the first input of the AND gate 645 is coupled to the output of the OR gate 640 associated with the eighth comparator set 602. The second input of this AND gate 645 is coupled to the output of the AND gate 645 associated with the seventh comparator set 601. For the AND gate 645 associated with the seventh comparator set 602, the first input of this AND gate 645 is coupled to the output of the OR gate 640 associated with the seventh comparator set 602, and the second input of this AND gate 645 is coupled to the output of the AND gate 645 associated with the sixth comparator set 601. Thus, for each AND gate 645 associated with a given comparator set C, the first input of the AND gate 645 is coupled to the output of the OR gate 640 associated with comparator set C, and the second input of the AND gate 645 is coupled to the output of the AND gate 645 associated with comparator set (C−1), for comparator sets two through eight 602, 603, 604, 605, 606, 607, 608. The signal present at each AND gate's second input is inverted upon arriving at the second input. In the event that more than one register file conflict is detected by the second parallel issue constraint circuit 218, the plurality of AND gates 645 ensures that the register file conflict corresponding to the smallest value of v is used to indicate the number of sequential instructions that satisfy the second parallel issue constraint.

The second priority encoder 650 comprises an encoder having a plurality of inputs and a plurality of outputs. An input corresponding to each set of comparators 601, 602, 603, 604, 605, 606, 607, 608 is present within the second priority encoder's plurality of inputs. Therefore, in the preferred embodiment, inputs one through eight are present. Input two is coupled to the output of the AND gate 645 associated with the second comparator set 602; input three is coupled to the output of the AND gate 645 associated with the third comparator set 603; and input four is coupled to the output of the AND gate 645 associated with the fourth comparator 604. Those skilled in the art will recognize that inputs five through eight of the second priority encoder 650 are coupled in a like manner. Input one of the second priority encoder 650 is coupled to the output of the OR gate 640 associated with the first comparator set 601 since the first comparator set 601 does not have an associated AND gate 645. The second priority encoder 650 functions such that when one of the first through eighth inputs is receiving a signal having a high value, the signal present at the plurality of second priority encoder 650 outputs is the binary value of the input at which the signal was received. This binary value is the second issue count, indicating the largest number of sequential instructions within the issue consideration group that satisfy the second parallel issue constraint. In the preferred embodiment, inputs one through eight are present in the second priority encoder 650. Four bits are required to represent the value 8. Therefore, in the preferred embodiment the plurality of second priority encoder outputs comprises four outputs.

Figure 12:
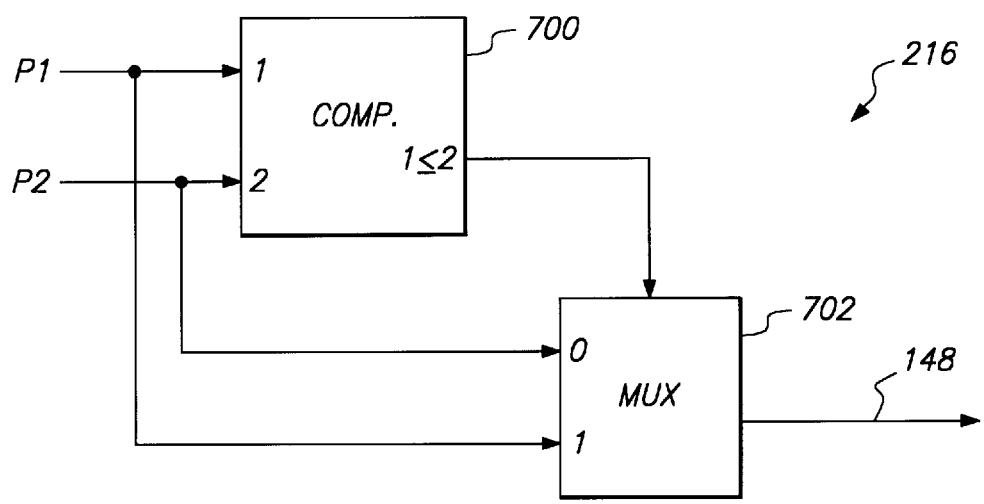
FIG. 12 is a block diagram of a preferred embodiment of an issue count selection circuit constructed according to the present invention.

Referring now to FIG. 12, a preferred embodiment of the issue count selection circuit 216 is shown. The issue count selection circuit 216 preferably comprises a comparator 700 having a first input, a second input, and an output; and a multiplexor 702 having a first input, a second input, a control input, and an output. The first input of the issue count selection circuit's comparator 700 is coupled to the output of the first priority encoder 550, and therefore receives the first issue count. In like manner, the second input of this comparator 700 is coupled to the output of the second priority encoder 650, and therefore receives the second issue count. The first input of the multiplexor 702 is coupled to the second input of the issue count selection circuit's comparator 700, and the second input of the multiplexor 702 is coupled to the first input of the issue count selection circuit's comparator 700. The control input of the multiplexor 702 is coupled to the output of the issue count selection circuit's comparator 700. The output of the multiplexor 702 is coupled to the issue count line 148. The comparator 700 within the issue count selection circuit 216 comprises combinational logic that determines if the binary value of the signal present at its first input is less than or equal to the binary value of the signal present at its second input. If so, the comparator 700 outputs a high value at its output; otherwise the output of the issue count selection circuit's comparator 700 corresponds to a low value. The multiplexor's control input routes either the signal present at its first input or the signal present at its second input to its output depending upon the signal applied to its control input. If the signal applied to the multiplexor's control input is a low value, the signal present at the multiplexor's first input is routed to the multiplexor's output. If the signal applied to the multiplexor's control input is a high value, the signal present at the multiplexor's second input is routed to its output. Since the first input of the comparator 700 and the second input of the multiplexor 702 within the issue count selection circuit 216 receive the first issue count, and the second input of the comparator 700 and the first input of the multiplexor 702 within the issue count selection circuit 216 receive the second issue count, the signal present at the output of the multiplexor 702 is the smaller (or same, if equal) of the first issue count and the second issue count. This signal is output as the next issue count P to the issue count line 148.

Figure 5:
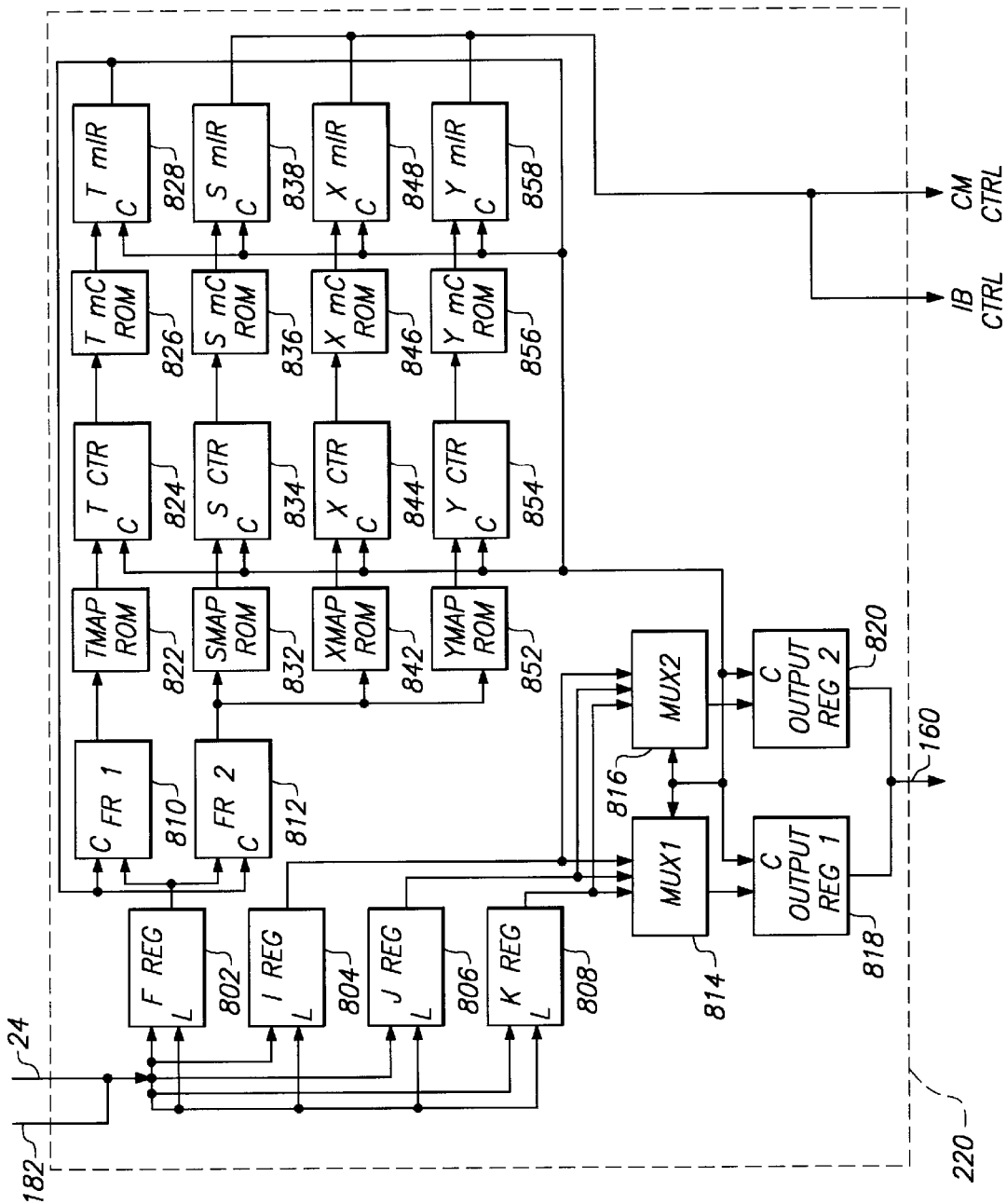
FIG. 5 is a block diagram of a preferred embodiment of a microsequencer of the present invention.

Referring now to FIG. 5, a block diagram of a preferred embodiment of the microsequencer 220 within the control unit 140 is shown. The microsequencer 220 comprises an F register 802, an I register 804, a J register 806, and a K register 808 for receiving an external FMAP; a first function register 810 and a second function register 812; a first and a second multiplexor 814, 816; a first and a second register file port 818, 820; a TMAP ROM 822, a T counter 824, a T microcode ROM 826, and a T microinstruction register; an SMAP ROM 822, an S counter 824, an S microcode ROM 826, and an S microinstruction register; an XMAP ROM 822, an X counter 824, an X microcode ROM 826, and an X microinstruction register; a YMAP ROM 822, a Y counter 824, a Y microcode ROM 826, and a Y microinstruction register.

The F, I, J, and K registers 802, 804, 806, 808 each comprise a data storage means having an input, a load input, and an output. The inputs of the F, I, J, and K registers are coupled to the control unit's AIO port such that they receive the F value, the I value, the J value, and the K value of an external FMAP, respectively. In addition, the inputs of the F, I, J, and K registers are each coupled to the branch line 182. The control inputs of the F, I, J, and K registers each receive the L value within the external FMAP. The external FMAP originates from the I/O control unit 130, and is transferred to the microsequencer 220 within the control unit 140 via the AIO bus 24. Those skilled in the art will recognize that a direct coupling from the I/O control unit 130 could also be used to transfer the external FMAP to the control unit's microsequencer 220. As in the case of the FMAPs sent to the plurality of functional units 270, the external FMAP specifies a set of operations that are to be performed. Receipt of the branch signal via the branch line 182 indicates a set of operations that are to be performed in the event that a branch is detected. The L value received from the external FMAP indicates whether the FMAP is to be loaded into the microsequencer 220. The microsequencer 220 carries out the operations required to perform a function indicated by the F value within the external FMAP received. Functions indicated by the F code within the external FMAP include a start continuous execution function, a single-step execution function, and a halt function.

The first and second multiplexors 814, 816 each comprise a signal selection means having a first input, a second input, a third input, and an output. The first inputs of the first and second multiplexors 814, 816 are coupled to the output of the K register 808. The second inputs of the first and second multiplexors 814, 816 are coupled to the output of the J register 806. The third inputs of the first and second multiplexors 814, 816 are coupled to the output of the I register 804. The first and second multiplexors 814, 816 serve to select which of the I, J, and K register outputs are to be routed into the control line 160 coupling the microsequencer 220 and the control unit address bitslice 230.

The first and second output registers 818, 820 each comprise a data storage means having an input, a control input, and an output. The inputs of the first and second output registers 818, 820 are coupled to the outputs of the first and second multiplexors 814, 816, respectively. Upon receiving an appropriate signal at their respective control inputs, the first and second output registers 818, 820 load the signals present at the outputs of the first and second multiplexors 814, 816 respectively. The outputs of the first and second output registers 818, 820 are routed together into the control line 160 coupling the microsequencer 220 and the control unit address bitslice 230. Therefore, the first and second output registers 810, 820 each serve to supply the contents of the I register 804, the J register 806, or the K register 808 to the control line 160.

The first and second function registers 810, 812 each comprise a data storage means having an input, a control input, and an output. The input of the first function register 810 and the input of the second function register 812 are coupled to the output of the F register 802. Upon receiving appropriate control signals at their control input, the first and second function registers 810, 812 load the F value. The first function register 810 and the second function register 812 can be loaded independently when necessary. The first function register 810 supplies the loaded F value to the TMAP ROM 822, while the second function register 812 supplies the loaded F value to the SMAP, XMAP, and YMAP ROMs 832, 842, 852.

The TMAP ROM 822, the T counter 824, the T microcode ROM 826, and the T microinstruction register 828 function together as a master nanosequencer within the control unit's microsequencer 220. The TMAP ROM 822 comprises a read-only memory having an input and an output. The input of the TMAP ROM is coupled to the output of the first function register 810, and therefore receives the F value. The TMAP ROM serves as a lookup table to transform the F value into a start-up address for an appropriate microcode sequence. The T counter 824 comprises a counting means having an input, a control input, and an output. The input of the T counter is coupled to the output of the TMAP ROM, and therefore receives a microcode sequence start-up address. The T counter increments or decrements the start-up address received, thereby tracking addresses within the microcode sequence. The T microcode ROM 826 comprises a read-only memory having an input and an output. The input of the T microcode ROM 826 is coupled to the output of the T counter 824. The T microcode ROM 826 receives the address supplied by the T counter 824, and outputs a corresponding microcode instruction. The T microinstruction register 828 comprises a data storage means having an input, a control input, and an output. The input of the T microinstruction register 828 is coupled to the output of the T microcode ROM. Therefore, the T microinstruction register 828 receives a microcode instruction. The master nanosequencer serves to control overall operation sequencing for the first, second, and third subordinate nanosequencers, as well as for the first and second multiplexors 814, 816 and the first and second output registers 818, 820. The output of the T microinstruction register is used to supply overall timing signals required within the control unit's microsequencer 220.

The SMAP ROM 832, the S counter 834, the S microcode ROM 836, and the S microinstruction register 838 form a first subordinate nanosequencer. The SMAP ROM 832 comprises a read-only memory having an input and an output. The input of the SMAP ROM is coupled to the output of the second function register 812, and therefore receives the F value. The SMAP ROM serves as a lookup table to transform the F value into a start-up address for an appropriate microcode sequence. The S counter 834 comprises a counting means having an input, a control input, and an output. The input of the S counter is coupled to the output of the SMAP ROM, and therefore receives a microcode sequence start-up address. The S counter increments or decrements the start-up address received, thereby tracking addresses within the microcode sequence. The S microcode ROM 836 comprises a read-only memory having an input and an output. The input of the S microcode ROM 836 is coupled to the output of the S counter 824. The S microcode ROM 836 receives the address supplied by the S counter 834, and outputs a corresponding microcode instruction. The S microinstruction register 838 comprises a data storage means having an input, a control input, and an output. The input of the S microinstruction register 838 is coupled to the output of the S microcode ROM. Therefore, the S microinstruction register 838 receives a microcode instruction. The microinstruction received is output at the S microinstruction register's output.

The XMAP ROM 842, the X counter 844, the X microcode ROM 846, and the X microinstruction register 848 form a second subordinate nanosequencer. The YMAP ROM 852, the Y counter 854, the Y microcode ROM 856, and the Y microinstruction register 858 form a second subordinate nanosequencer. Those skilled in the art will recognize that the each element's couplings and functionality within the second and third subordinate nanosequencers are analogous to those for the elements in the first subordinate nanosequencer. The outputs of the S microinstruction register 838, the X microinstruction register 848, and the Y microinstruction register 858 supply the signals required for instruction buffer 120 control and central memory 100 control.

The operation of first, second, and third subordinate nanosequencers is initiated by the master nanosequencer. Following operation initiation, each nanosequencer performs a given set of actions independently, using the signal present at the output of the T microinstruction register 828 for sequencing purposes. With the exception of the F, I, J, and K registers 802, 804, 806, 808, the control inputs of those elements within the microsequencer 220 having a control input are coupled to the output of the T microinstruction register 828.

Those skilled in the art will recognize that a different number of multiplexors, a different number of output registers, or a different number of nanosequencers can be used within an alternate embodiment of the control unit's microsequencer 220.

Figure 6:
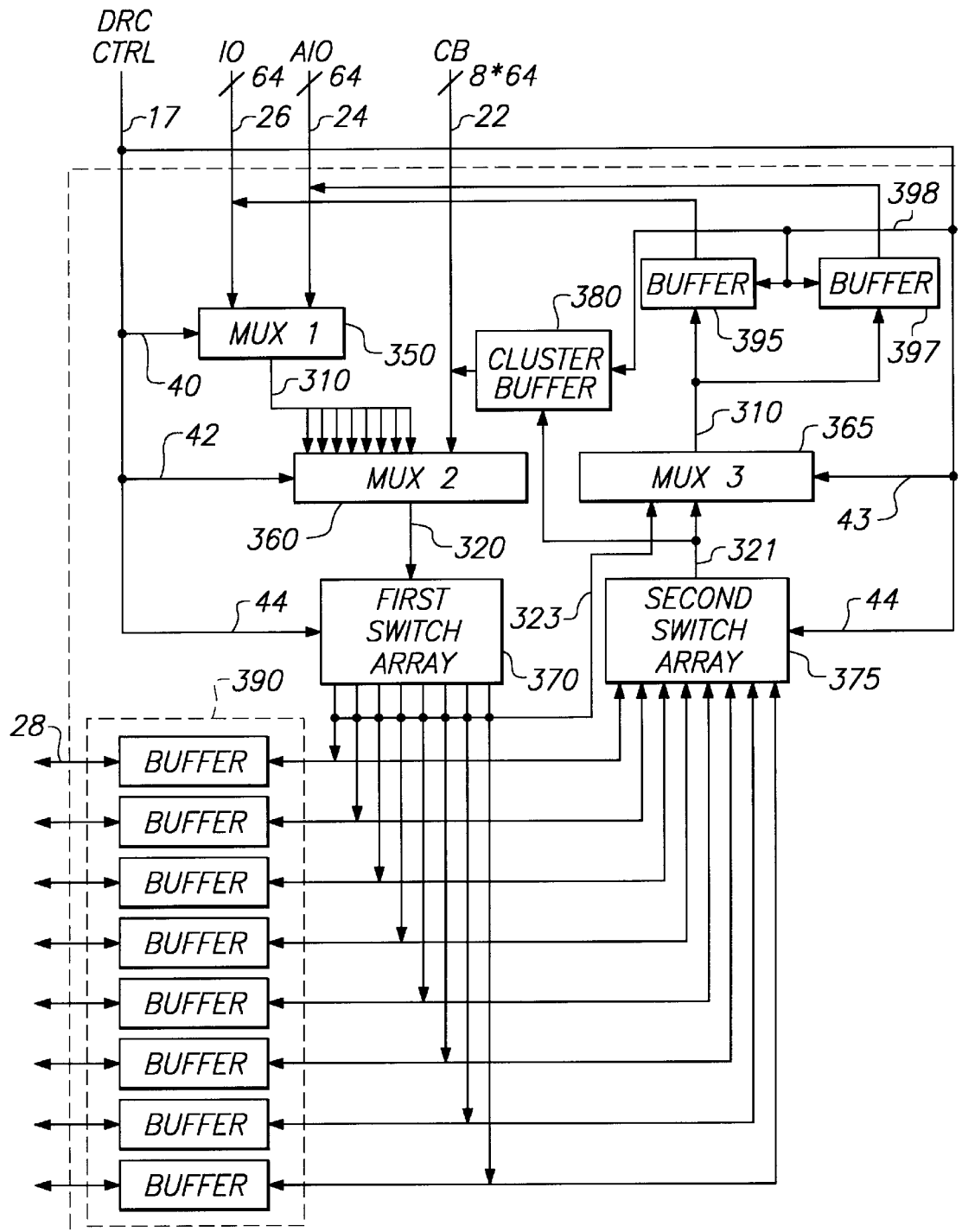
FIG. 6 is a block diagram of a preferred embodiment of a data routing circuit of the present invention.

Referring now to FIG. 6, a block diagram of a preferred embodiment of the data routing circuit 300 is shown. The data routing circuit 300 comprises a first multiplexor 350, a second multiplexor 360, a third multiplexor 365, a first switch array 370, a second switch array 375, a cluster buffer 380, a plurality of buffers 390, a first data word buffer 395, and a second data word buffer 397. The first multiplexor 350 has a first data word input, a second data word input, a control input, and a data word output. The first data word input of the first multiplexor is coupled to the AIO bus 24, and the second data word input of the first multiplexor is coupled to the IO bus 26. The control input of the first multiplexor 350 is coupled to a first select line 40, where the first select line 40 is a portion of the control signal bus 17. The signal applied to the first select line 40 determines whether the first multiplexor 350 routes the data word present on the IO bus 26 or the data word present on the AIO bus 24 to its data word output.

The second multiplexor 360 has a first cluster input, a second cluster input, a control input, and a cluster output. The first and second cluster inputs are formed from a plurality of data word portions, and receive a plurality of data words equal to the number of data words present in the cluster bus 22. The first cluster input of the second multiplexor 360 is coupled to the cluster bus 22. The second cluster input of the second multiplexor 360 is coupled to the data word output of the first multiplexor 350 via a data word duplication line 310. The data word duplication line 310 applies the single data word output of the first multiplexor 350 to each data word portion within the second cluster input. The control input of the second multiplexor 360 is coupled to a second select line 42, where the second select line 42 is a portion of the control signal bus 17. The signal applied to the second select line determines whether the data words present upon the cluster bus 22 or the duplicated data words from the first multiplexor's data word output are routed to the cluster output of the second multiplexor 360.

The first switch array 370 comprises an array of data routing elements having a cluster input, a control input, and a plurality of data word outputs. The cluster input of the first switch array 370 is coupled to the second multiplexor's cluster output via a first cluster line 320. The first switch array's control input is coupled to a third select line 44, where the third select line 44 is a portion of the control signal bus 17. The signal applied to the control input of the first switch array 370 determines the routing or mapping of each data word present at the cluster input to a given data word output. A given data word present at the first switch array's cluster input can be routed to any given data word output.

The plurality of buffers 390 comprises a plurality of data storage means, where each buffer 390 within the plurality has a first bidirectional data word port and a second bidirectional data word port. Each first bidirectional data word port within the plurality of buffers 390 is coupled to a corresponding data word output of the first switch array 370. Each second bidirectional data word port within the plurality of buffers 390 forms a corresponding bidirectional data word port of the data routing circuit 300. Each buffer 390 therefore serves to transfer data between a corresponding register file 260 and the first switch array 370.

The second switch array 375 comprises an array of data routing elements having a plurality of data word inputs, a control input, and a cluster output. Each data word input within the second switch array's plurality of data word inputs is coupled to a respective first bidirectional data word port within the plurality of buffers 390. The control input of the second switch array 375 is coupled to the third select line 44. The signal applied to the third select line 44 determines the routing or mapping that each data word present at the plurality of data word inputs receives in being transferred to the second switch array's cluster output at line 321.

In the preferred embodiment of the hyperscalar computer architecture 10, $2^M$ data words occupy a data word cluster. Each data word output within the first switch array's plurality of data word outputs corresponds to a predetermined register file 260. Similarly, each data word input within the second switch array's plurality of data word inputs corresponds to a predetermined register file 260. Since $2^M$ register files 260 are present in the preferred embodiment of the hyperscalar computer architecture, the plurality of data word outputs of the first switch array 370 and the plurality of data inputs of the second switch array 375 can be considered to be a data word cluster. Therefore, in the preferred embodiment of the hyperscalar computer architecture 10, the first switch array 370 and the second switch array 375 are identical elements.

The third multiplexor 385 comprises a signal selection means having a first cluster input, a second cluster input, a control input, and a data word output. The first cluster input of the of the third multiplexor 365 is coupled to each data word output of the first switch array 370 via a third cluster line 323. The second cluster input of the third multiplexor 365 is coupled to the cluster output of the second switch array 375 via a second cluster line 321. The control input of the third multiplexor is coupled to a fourth select line 43, where the fourth select line 43 is a portion of the control signal bus 17. The third multiplexor 365 receives at its first cluster input each data word present at the plurality of data word outputs of the first switch array 370. The third multiplexor 365 receives at its second cluster input each data word present within the second switch array's cluster output. Depending upon the value of a signal present on the fourth select line 43, the third multiplexor 365 routes a data word received at its first cluster input or a data word received at its second cluster input to its data word output.

The first data word buffer 395 comprises a data storage means having an input, an output, and a control input. The input of the first data word buffer 395 is coupled to the data word output of the third multiplexor 365. The output of the first data word buffer 395 is coupled to the IO bus 26. The control input of the first data word buffer 365 is coupled to the control signal bus 17 via a buffer control line 398. A first load signal present at the first data word buffer's control input causes the first data word buffer 395 to load the data word present at its input. A first output signal present at the first data word buffer's control input causes the first data word buffer 395 to output its contents to the IO bus 26.

The second data word buffer 397 comprises a data storage means having an input, an output, and a control input. The input of the second data word buffer 397 is coupled to the data word output of the third multiplexor 365. The output of the second data word buffer 397 is coupled to the AIO bus 24. The control input of the second data word buffer 365 is coupled to the control signal bus 17 via the buffer control line 398. A second load signal present at the second data word buffer's control input causes the second data word buffer 397 to load the data word present at its input. A second output signal present at the second data word buffer's control input causes the second data word buffer 397 to output its contents to the AIO bus 24.

The cluster buffer 380 is a data storage means having an input, an output, and a control input. The input of the cluster buffer 380 is coupled to the cluster output of the second switch array 375 via the second cluster line 321, and the output of the cluster buffer 380 is coupled to the cluster bus 22. The control input of the cluster buffer 380 is coupled to the control signal bus 17 via the buffer control line 398. The cluster buffer 380 loads the data word cluster present at the cluster output of the second switch array 375 in response to a cluster load signal received at its control input. A cluster output signal present at the cluster buffer's control input causes the data word cluster stored within the cluster buffer 380 to be output to the cluster bus 22.

The data routing circuit 300 operates in a "forward" transfer mode, defined as a data word cluster transfer to the plurality of register files 260, or in "reverse" transfer mode when a data word cluster is transferred from the plurality of register files 260 to another location. In the forward transfer mode, a data word cluster can be routed from the cluster bus 22 to the plurality of register files 260, where each data word within the data word cluster is uniquely routed to a given register file 260. The particular routing applied to each data word in the data cluster is determined by the signal present on the third select line 44, and is performed by the first switch array 370. Alternatively, a single data word can be routed from either the AIO bus 24 or the IO bus 26 to each register file 260 within the plurality of register files 260. When a single data word is routed in the forward transfer mode, the data word duplication line 310 inserts the single data word into each data word of a data word cluster. In this case, each data word within the data word cluster is identical to the single data word.

When functioning in reverse transfer mode, the data routing circuit 300 can route the data word present on each data word bus 28 to the cluster bus 22, where each data word is mapped into a unique datapath position within the cluster bus 22 by the second switch array 375. Alternatively, a data word present on any given data word bus 28 can be routed to either the AIO bus 24 or the IO bus 26.

Figure 7A:
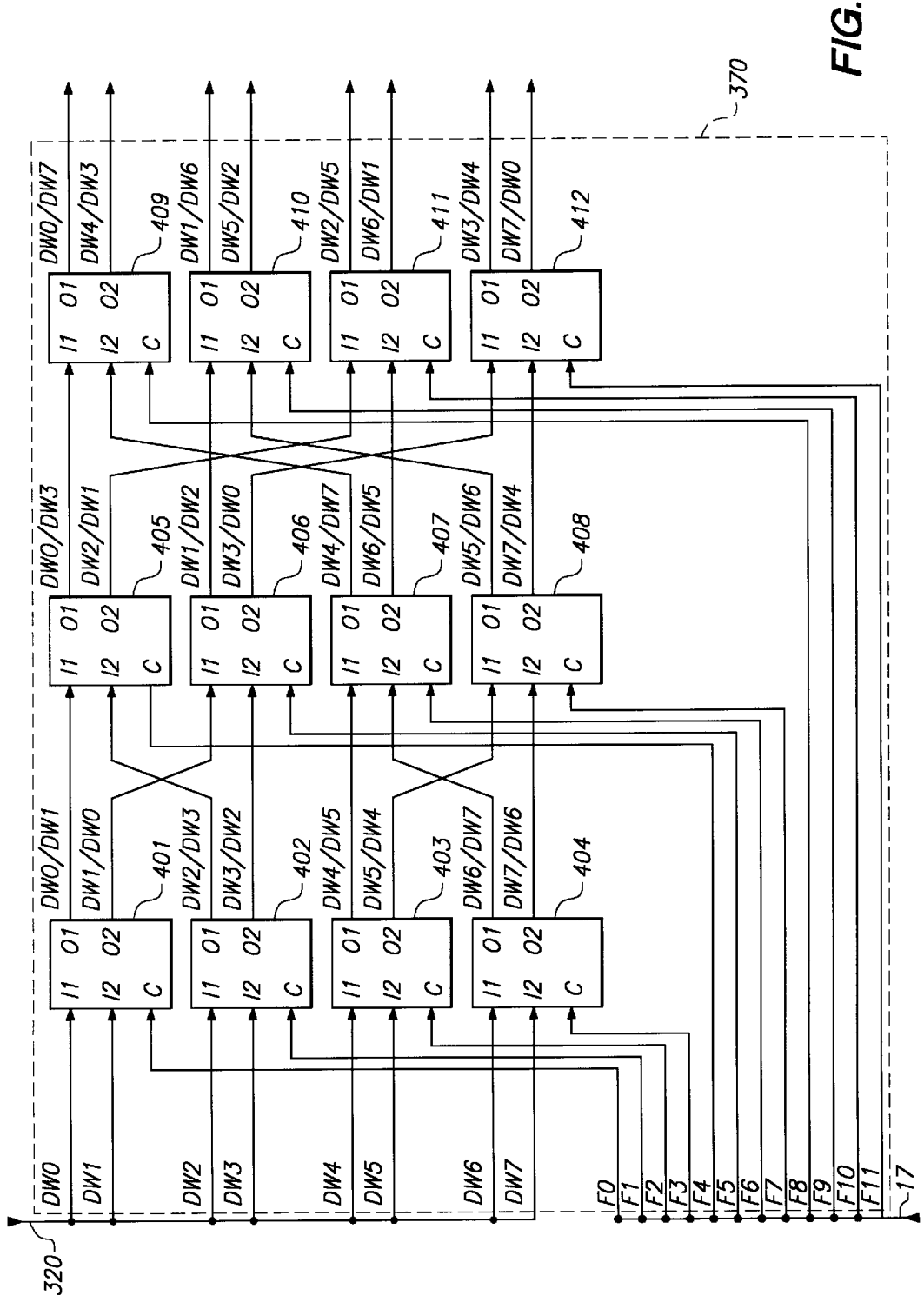
FIG. 7A is a block diagram of a first switch array according to the preferred embodiment of the present invention.

Referring now to FIG. 7A, a block diagram of a preferred embodiment of the first switch array 370 is shown. In the preferred embodiment, the first and second switch arrays 370, 375 are identical elements, thus only the first switch array 370 is described. The first switch array 370 comprises an array of first through twelfth data word routing elements 401, 402, 403, 404, 405, 406, 407, 408, 409, 410, 411, 412, each having a first input, a second input, a control input, a first output, and a second output. The control input of the first data word routing element 401 is coupled to the third select line 44, and receives a first routing signal. In like manner the control inputs of the second through twelfth data word routing elements 402 through 412 are coupled to the third select line 44, and receive a second through twelfth routing signal, respectively. The first and second inputs of the first, second, third, and fourth data routing elements 401, 402, 403, 404 form the first switch array's cluster input. The first and second inputs of the first data routing element 401 are coupled to the first cluster line 320 and receive a data word 0 and a data word 1, respectively. The first and second inputs of the second data routing element 402 are also coupled to the first cluster line 320, and receive a data word 2 and a data word 3, respectively. Similarly, the first and second inputs of the third data routing element 403 are coupled to the first cluster line 320, and therefore, receive a data word 4 and a data word 5, respectively. The first and second inputs of the fourth data routing element 404 receive a data word 6 and a data word 7, respectively, because they are also coupled to the first cluster line 320. Each data word present at the first or second input of the first, second, third, and fourth data routing elements 401, 402, 403, 404 is routed according to the respective routing signal to either its own first output or its own second output. In the preferred embodiment, a routing signal having a low value causes the data word present at a given data routing element's first input to appear at the data routing element's first output, and the data word present at the data routing element's second input to be output at the data routing element's second output. A routing signal having a high value causes the data word present at the data routing element's first input to appear at its second output, and the data word present at the data routing element's second input to appear at its first output.

The first outputs of the first and third data routing elements 401, 403 are coupled to the first inputs of the fifth and seventh data routing element 405, 407 respectively. The second outputs of the first and third data routing elements 400, 403 are coupled to the second inputs of the sixth and eighth data routing elements 406, 408, respectively. The first outputs of the second and fourth data routing elements 402, 404 are coupled to the second inputs of the fifth and seventh data routing elements 405, 407, respectively. The second outputs of the second and fourth data routing elements 402, 404 are coupled to the second inputs of the sixth and eighth data routing elements, respectively 406, 408. Based upon the value of the fifth through eighth routing signals, data words present at the inputs of the fifth through eighth data routing elements' first and second inputs are routed to their first and second outputs and in the manner described above.

The first outputs of the fifth and sixth data routing elements 405, 406 are coupled to the first inputs of the ninth and tenth data routing elements 409, 410, respectively. The second outputs of the fifth and sixth data routing elements 405, 406 are coupled to the first input of the eleventh and twelfth data routing elements 411, 412, respectively. The first outputs of the seventh and eighth data routing elements 407, 408 are coupled to the second inputs of the ninth and tenth data routing elements 409, 410, respectively. Finally, the second outputs of the seventh and eighth data routing elements 407, 408 are respectively coupled to the second inputs of the eleventh and twelfth data routing elements 411, 412, respectively. Based upon the value of the ninth through twelfth routing signals, data words present at the inputs of the ninth through twelfth data routing elements' first and second inputs are routed to their first and second outputs and in the manner described above.

The first output of the ninth data routing element 409 forms the first output of the first switching array 370, and the second output of the ninth data routing element 409 forms the second output of the first switching array 370. In like manner, the first and second outputs of the tenth through twelfth data routing elements 410, 411, 412 form the third and fourth, the fifth and sixth, and the seventh and eighth outputs of the first switching array 370, respectively for each first switching array output pair given.

Two routing cases are indicated in FIG. 7. The first corresponds to each of the twelve routing signals having a value of 0 and the second corresponds to each of the twelve routing signals having a value of 1. The data word routing between the first switch array's cluster input and the first switch array's plurality of outputs is indicated in the figure at each data routing element's first and second output. Each data word is indicated by the letters "DW" followed by its number. The data word to the left of the slash mark in FIG. 7 corresponds to the case in which each of the twelve routing signals has the value 0, whereas the data word to the right of the slash mark corresponds to the case in which each routing signal has the value 1. Those skilled in the art will recognize that this routing scheme allows a plurality of many-to-many data word routings to one or several of the outputs of the array 370. In the preferred embodiment, each data word routing element 401, 402, 403, 404, 405, 506, 407, 408, 409, 410, 411, 412 comprises a Banyan switch 480.

Figure 7B:
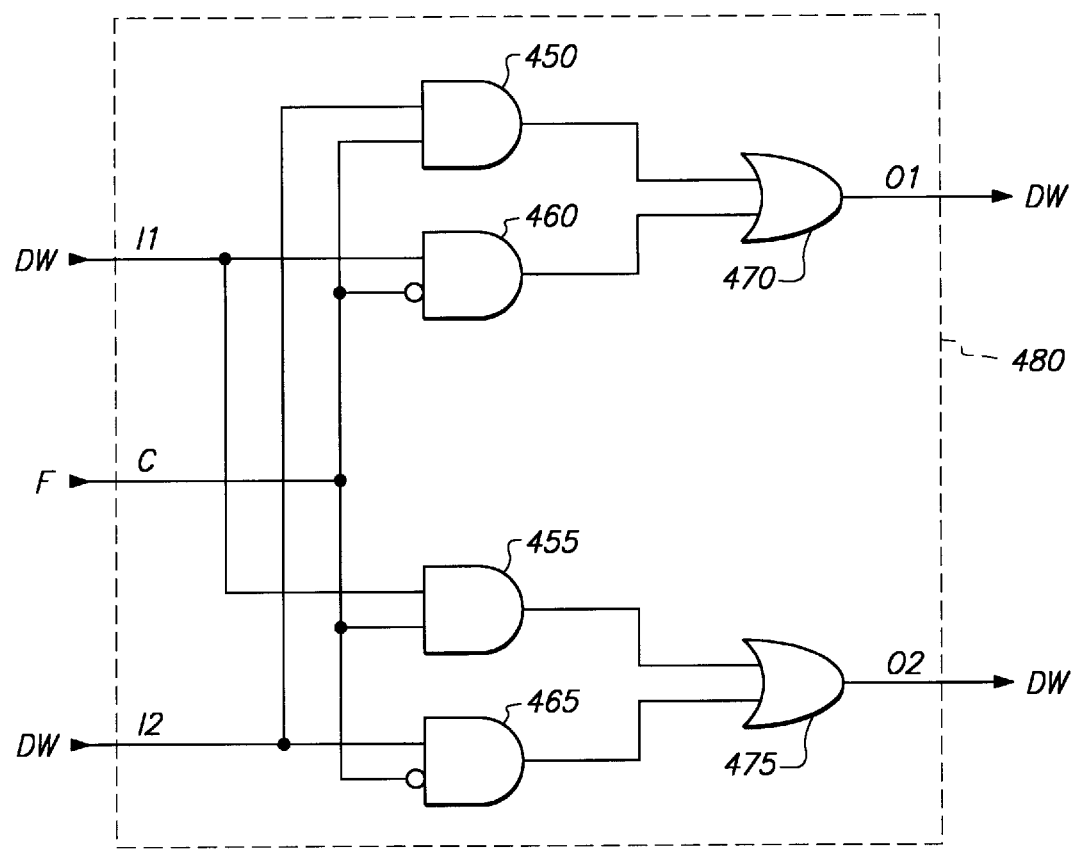
FIG. 7B is a block diagram of a Banyan switch within the first switch array according to the preferred embodiment of the present invention.

Referring now to FIG. 7B, a block diagram of a Banyan switch 480 is shown. The Banyan switch 480 comprises a first AND gate 450, a second AND gate 460, a third AND gate 455, a fourth AND gate 465, a first OR gate 470, and a second OR gate 475. Each AND gate 450, 455, 460, 465 and each OR gate 470, 475 has a first input, a second input, and an output. The first input of the first AND gate 450 is the second input of the Banyan switch 480, and the second input of the first AND gate 450 is the control input of the Banyan switch 480. The first input of the second AND gate 460 is the Banyan switch's first input, and the second input of the second AND gate 460 is coupled to the Banyan switch's control input, where the routing signal present at the control input is inverted upon its assertion at the second AND gate's second input. The output of the first AND gate 450 and the output of the second AND gate 460 are coupled to the first and second input of the first OR gate 470, respectively. The output of the first OR gate 470 forms the first output of the Banyan switch 480.

The first input of the third AND gate 455 is the Banyan switch's first input, and the second input of the third AND gate 455 is coupled to the control input of the Banyan switch 480. The first input of the fourth AND gate 465 is the second input of the Banyan switch 480, and the second input of the fourth AND gate 465 is the Banyan switch's control input, where the routing signal present at the control input is inverted upon its assertion at the fourth AND gate's second input. The output of the third and fourth AND gates 455, 465 are coupled to the first and second inputs of the second OR gate 475, respectively. The output of the second OR gate 475 forms the second output of the Banyan switch 480.

In the preferred embodiment of the Banyan switch 480, if the routing signal present at the Banyan switch's control input is low, the first AND gate 450 and the output of the third AND gate 455 are forced low or disabled. Due to the inverting of the routing signal asserted at the second inputs of the second and fourth AND gates 460, 465, the data word present at the first input of the second AND gate 460 is routed to the Banyan switch's first output, and the data word present at the first input of the fourth AND gate 465 is routed to the Banyan switch's second output. Therefore, for a routing signal having a low value, the data element routes the data word present at its first input to its first output and the data word present at its second input to its second output. Those skilled in the art will recognize that a routing signal having a high value will cause the data word present at the first output of the data routing element to appear at the data routing element's second output, and the data word present at the data routing element's second input to appear at the data routing element's first output.

Figure 8:
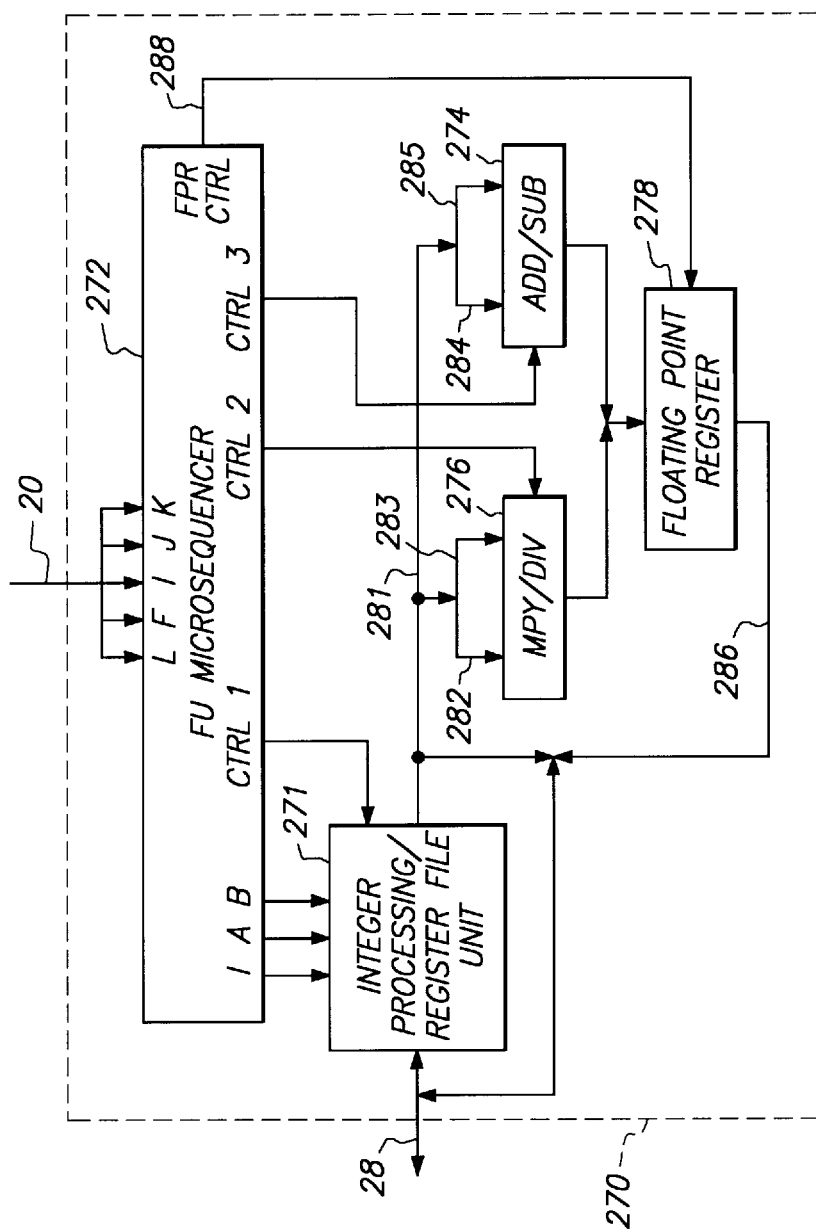
FIG. 8 is a block diagram of a preferred embodiment of a functional unit constructed according to the present invention.

Referring now to FIG. 8, a block diagram of a preferred embodiment of each functional unit 270 and register file 260 is shown. Each functional unit 270 and register file 260 comprises a FU microsequencer 272, an integer processing/register file unit 271, a multiply/divide unit 276, an add/subtract unit 274, and a floating point register 278. The integer processing/register file unit 271 comprises 64-bit integer arithmetic hardware and the register file 260 associated with the functional unit 270. The integer processing/register file unit 271 has an I input, an A input, a B input, a control input, a data word input, and a data word output. The data word input of the integer processing/register file unit 271 is coupled to its data word output, to the data word bus 28 corresponding to the register file 260, and to a first 64-bit line 281. The signal present at the I input indicates the address at which to store the result of a computation performed by the functional unit 270. The A and B inputs receive the addresses of the first and second data items. The integer processing/register file unit's control input specifies a specific integer operation or a register file data transfer operation. The result of an integer operation or the data item associated with a data transfer operation appears at the integer processing/register file unit's data word input and data word output. A signal received at the integer processing unit's control input determines the operation performed by the integer processing/register file unit 271, and provides an output enable signal. In an exemplary embodiment, the integer processing/register file unit 271 comprises four Integrated Devices Technology IDT49C402A 16-bit bitslices.

The FU microsequencer 272 comprises a microsequencer having an L input, an F input, an I input, a J input, a K input, an I output, an A output, a B output, and a first, a second, and a third control output. The L, F, I, J, and K inputs of the FU microsequencer 272 receive the L value, the F value, the I value, the J value, and the K value within the FMAP, and therefore form the FU microsequencer's FMAP input and are coupled to the appropriate FMAP transfer line 20. The I, A, B, and first control output of the FU microsequencer are coupled to the I, A, B, and control input of the integer processing/register file unit 271, respectively. The L value within each FMAP received determines whether the FU microsequencer will load the FMAP at its F, I, J, and K inputs. If the L value indicates that the functional unit 271 is not to load the FMAP, the functional unit 270 does not perform any operations related to the FMAP that is present at its inputs. When an FMAP is loaded, the FU microsequencer 272 receives the FMAP's F value at its F input. The F value indicates the address of a microprogram corresponding to the particular instruction that the FU microsequencer 272 is to execute. The FU microsequencer 272 uses the J value to indicate the address of the first data item and the K value to indicate the address of the second data item required in the execution of the microprogram. The I value indicates to the FU microsequencer 272 the address at which the result of the instruction corresponding to the F value is to be stored.

The multiply/divide unit 276 comprises a 64-bit floating point multiplier/divider having a first input, a second input, a control input, and an output. The control input of the multiply/divide unit 276 is coupled to the second control output of the FU microsequencer 272. The first input of the multiply/divide unit 276 is coupled to the first 64-bit line via a first 32-bit line 282, and the second input of the multiply/divide unit 276 is coupled to the first 64-bit line via a second 32-bit line 283. Therefore, the first input of the multiply/divide unit 276 receives a first 32-bit portion of a 64-bit value, and the second input of the multiply/divide unit 276 receives a second 32-bit portion of a 64-bit value. The multiply/divide unit 276 performs a multiplication or a division upon the first and second 32-bit portions based upon the signal received at its control input. The result of the operation is output at the multiply/divide unit's output. In an exemplary embodiment, the multiply/divide unit 276 is an Analog Devices ADSP3212 64-bit floating point multiplier/divider.

The add/subtract unit 274 comprises a 64-bit floating point adder/subtractor having a first input, a second input, a control input, and an output. The control input of the add/subtract unit 274 is coupled to the third control output of the FU microsequencer 272. The first input of the add/subtract unit 274 is coupled to the first 64-bit line via a third 32-bit line 284, and the second input of the add/subtract unit 274 is coupled to the first 64-bit line via a fourth 32-bit line 285. Therefore, the first input of the add/subtract unit 274 receives the first 32-bit portion of a 64-bit value, and the second input of the add/subtract unit 274 receives the second 32-bit portion of a 64-bit value. The add/subtract unit 274 performs an addition or subtraction upon the first and second 32-bit portions based upon a signal received at its control input. The result of the operation is output at the add/subtract unit's output. In an exemplary embodiment, the add/subtract unit 274 is an Analog Devices ADSP3222 64-bit floating point adder/subtractor.

The floating point register 278 comprises a 64-bit data storage means having a data input, a data output, and a control input. The control input of the floating point register 278 is coupled via line 288 to the FPR CTRL output of the FU microsequencer 272 to receive control signals. The input of the floating point register 278 is coupled to the output of the multiply/divide unit 276 and to the output of the add/subtract unit 274. The output of the floating point register 278 is coupled to the first 64-bit line 281 via a second 64-bit line 286. The floating point register 278 receives and latches the result generated by the multiply/divide unit 276 or the add/subtract unit 274, and supplies this result to the first 64-bit line via the second 64-bit line 286. By supplying the result back to the first 64-bit line, the result can be stored in the integer processing/register file unit 271, or the result can be operated upon by the multiply/divide unit 276 or the add/subtract unit 274.

Figure 9A:
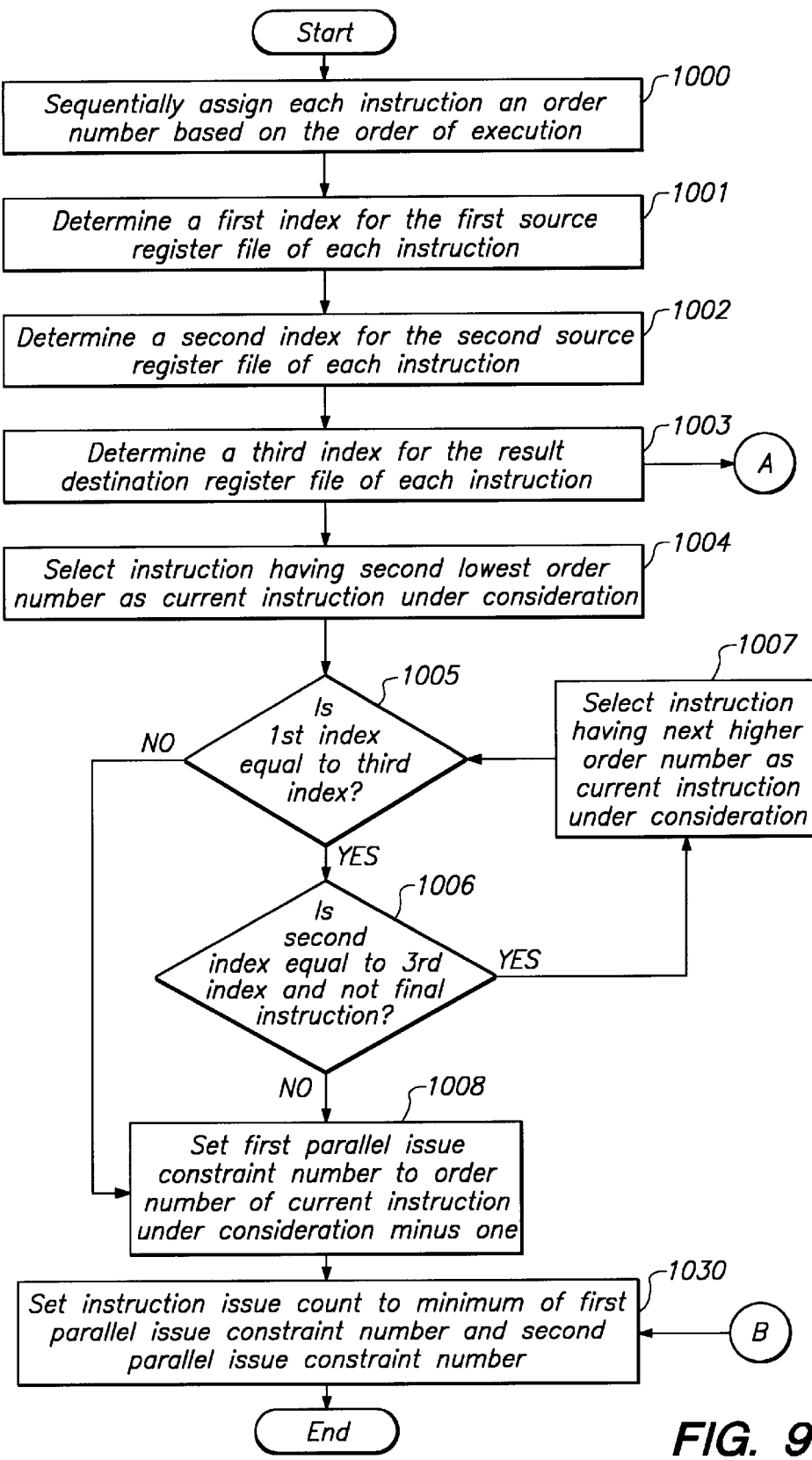
FIGS. 9A and 9B are a flowchart of a preferred method for issuing instructions in the hyperscalar computer architecture of the present invention.
Figure 9B:
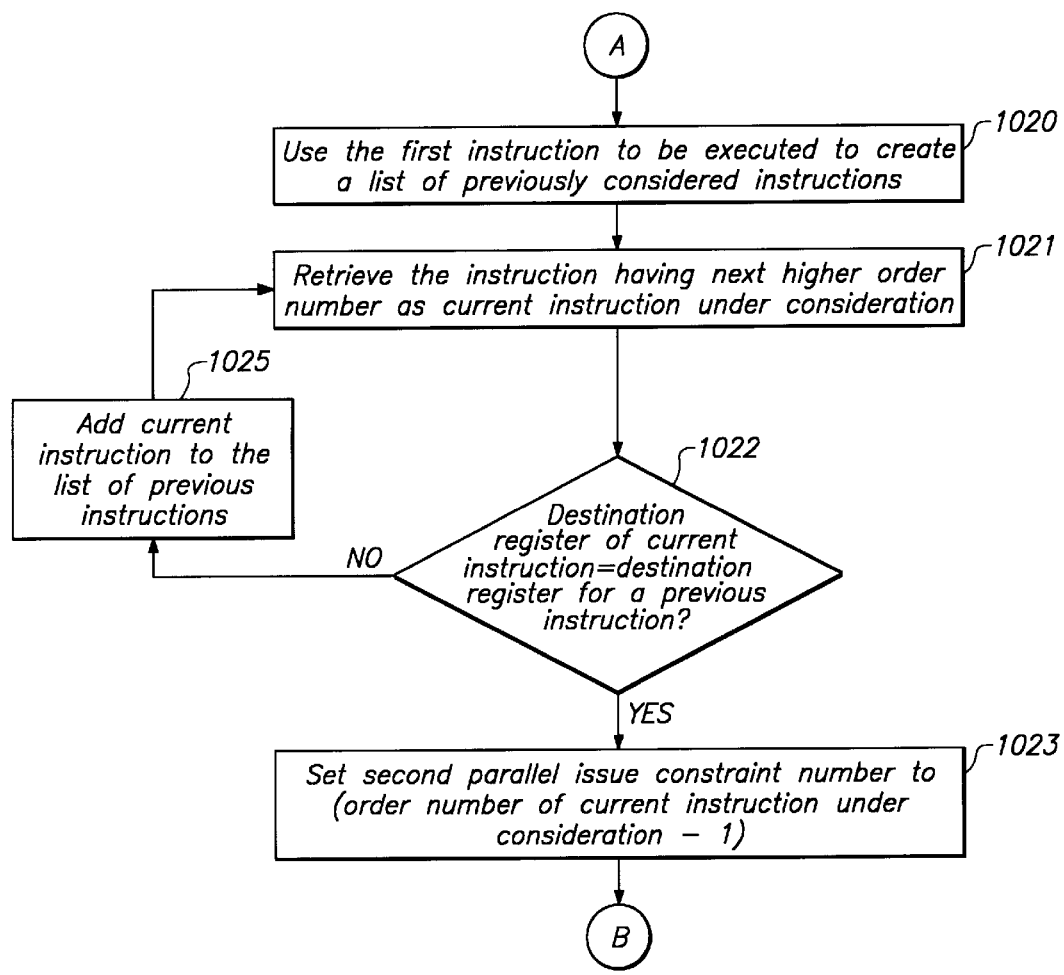

Referring now to FIG. 9, a flowchart of a preferred method for hyperscalar instruction issue is shown. The preferred method begins in step 1000, with an assignment of an order number to each instruction within the issue consideration group. Each order number indicates the serial arrangement of instructions within the instruction buffer 130. Next, in step 1001, the preferred method determines for each instruction a first index for the first source register file 260. Following step 1001, the preferred method determines for each instruction in step 1002 a second index for the second source register file 260. After step 1002, the preferred method determines for each instruction a third index for the result destination file in step 1003. Following step 1003, the preferred method proceeds to step 1004 and step 1010 simultaneously. In step 1004, the preferred method selects the instruction having the second lowest order number as the current instruction under consideration. Since the instruction having the lowest order number is issued regardless of whether additional instructions can be issued with it in parallel, step 104 does not consider the instruction having the lowest order number. After step 1004, the preferred method determines for the current instruction under consideration whether the first index is equal to the third index. If the first index is not equal to the third index, the first data item required for the execution of the current instruction under consideration is stored in a register file 260 other than the result destination register file 260. This situation corresponds to a register file conflict. In the presence of a register file conflict, the preferred method proceeds to step 1008 and sets a first parallel issue constraint number to the order number of the instruction under consideration minus one. Following step 1008, the preferred method proceeds to step 1030.

If in step 1005 the first index is found to be equal to the third index, the preferred method proceeds to step 1006 to test whether the second index is equal to the third index. In a manner similar to that in step 1005, if the second index is not equal to the third index, the second data item required for the execution of the instruction under consideration is stored in a register file 260 other than the result destination file. A register file conflict therefore exists in this situation. If a register file conflict is detected in step 1006, the preferred method proceeds to step 1008. If the preferred method determines that no register file conflict exists in step 1006, operation continues in step 1007 with the preferred method selecting the instruction having the next higher order number as the current instruction under consideration. Following step 1007, the preferred method returns to step 1005.

In step 1020, the preferred method uses the instruction having the lowest order number to create a list of previously considered instructions. The instruction having the lowest order number will be issued regardless of whether additional instructions can be issued with it in parallel. Therefore, the instruction having the lowest order number is placed into the list of previously considered instructions by default. Next, in step 1021, the preferred method retrieves the instruction having the next higher order number and identifies it as the current instruction under consideration. The preferred method then determines in step 1022 whether the third index of the current instruction under consideration matches the third index of any instruction in the list of previously considered instructions. A third index match indicates that the instructions corresponding to the match require the same result destination register file 260. Since instructions are issued in parallel, the result destination register file 260 of each instruction issued must be unique to avoid a register file conflict. If no third index matches are found in step 1022, the preferred method proceeds to step 1025 and adds the current instruction under consideration to the list of previously considered instructions. Following step 1025, the preferred method returns to step 1021. If it is determined in step 1022 that the third index of the current instruction matches one or more result destination files in the list of previously considered instructions, the preferred method proceeds to step 1023. In step 1023, the preferred method sets a second parallel issue constraint number to the order number of the current instruction under consideration minus one. After step 1023, the preferred method proceeds to step 1030.

In step 1030, the preferred method selects the minimum of the first parallel issue constraint number and the second parallel constraint number as the instruction issue count. The instruction issue count indicates the number of instructions that can be issued in parallel. In the preferred method, steps 1004 through 1008 are performed in parallel for all instructions within the issue consideration group. Steps 1020 through 1025 are also performed in parallel for all instructions within the issue consideration group. Following step 1030, the preferred method ends.

While the present invention has been described with reference to certain preferred embodiments, those skilled in the art will recognize that certain modifications and variations may be provided. These and other modifications to and variations upon the preferred embodiments are provided for by the present invention, which is limited only by the following claims.

d) adding the current instruction to the list and returning to step b) if the destination register file of the current instruction is not the same as the destination register file of any instruction in the list; and e) outputting the order number of the current instruction under consideration minus one if the destination register file of the current instruction is the same as the destination register file of any instruction in the list; and

APPENDIX A

Hyperscalar Computer Architecture Instruction Set

| Mnemonic | Instruction Description | Mixed Radix Code | Instruction Operation |
|---|---|---|---|
| AND i,j,k | 64-bit bitwise AND | 00\|j\|k\|i | Ri = Rj & Rk |
| OR i,j,k | 64-bit bitwise OR | 01\|j\|k\|i | Ri = Rj \| Rk |
| XOR i,j,k | 64-bit bitwise XOR | 02\|j\|k\|i | Ri = Rj ^ Rk |
| INV i,j,k | 64-bit bitwise invert (NOT) | 03\|000\|k\|i | Ri = ~Rk |
| LSL i,j,k | 64-bit logical shift left | 04\|j\|k\|i | (ulong)Ri = (ulong)Rj << Rk |
| LSR i,j,k | 64-bit logical shift right | 05\|j\|k\|i | (ulong)Ri = (ulong)Rj >> Rk |
| ROL i,j,k | 64-bit logical rotate left | 06\|j\|k\|i | (ulong)Ri = (ulong)Rj rol Rk |
| ROR i,j,k | 64-bit logical rotate right | 07\|j\|k\|i | (ulong)Ri = (ulong)Rj ror Rk |
| BYTE i,j,k | right-align selected 8-bit field | 08\|j\|k\|i | Ri = (Rj >> ((Rk &= 0x7) << 3)) &= 0xFF |
| LADD i,j,k | 64-bit 2's complement integer add | 09\|j\|k\|i | (long)Ri = (long)Rj + (long)Rk |
| LSUB i,j,k | 64-bit 2's complement integer sub | 0A\|j\|k\|i | (long)Ri = (long)Rj − (long)Rk |
| ADDQ i,SDATA | 18-bit SDATA added to Ri | 0B\|SDATA\|i | (long)Ri += (long)SDATA |
| ADD i,j,k | 64-bit floating-point addition | 0C\|j\|k\|i | (double)Ri = (double)Rj + (double)Rk |
| SUB i,j,k | 64-bit floating-point subtract | 0D\|j\|k\|i | (double)Ri = (double)Rj − (double)Rk |
| MUL i,j,k | 64-bit floating-point multiply | 0E\|j\|k\|i | (double)Ri = (double)Rj * (double)Rk |
| DIV i,j,k | 64-bit floating-point divide | 0F\|j\|k\|i | (double)Ri = (double)Rj / (double)Rk |
| LD i,*j,K | LD 1 to K words into successive Ri | 10\|j\|KDATA\|i | for (w=0;w<KDATA;w++) {R[i++] = *Rj; Rj+=8;} |
| ST i,*j,K | ST 1 to K words from successive Ri | 11\|j\|KDATA\|i | for (w=0;w<KDATA;w++) {*Rj = R[i++]; Rj+=8;} |
| LDA i,SDATA | Load Ri with Address with offset | 12\|SDATA\|i | Ri = (CIP++) + (slong)SDATA |
| LDIA i,UDATA | Load Ri Address Indirect with offset | 13\|UDATA\|i | Ri = (CIP++) + *R0 + (ulong)UDATA |
| LDL i,SDATA | Load Ri with 18-bit immediate literal | 14\|SDATA\|i | Ri = (long)SDATA |
| LDIL i,UDATA | Load Ri with indirect literal | 15\|UDATA\|i | Ri = (R0 + (ulong)UDATA) |
| BEQ i,RADDR | Branch to CIP+=RADDR if (Ri == 0) | 16\|RADDR\|i | CIP = ((long)Ri == 0) ? CIP+=RADDR : CIP++ |
| BPL i,RADDR | Branch to CIP+=RADDR if (Ri > 0) | 17\|RADDR\|i | CIP = ((long)Ri > 0) ? CIP+=RADDR: CIP++ |
| BMI i,RADDR | Branch to CIP+=RADDR if (Ri < 0) | 18\|RADDR\|i | CIP = ((long)Ri < 0) ? CIP+=RADDR: CIP++ |
| BREQ i,*k | Branch to *Rk if (Ri == 0) | 19\|000\|k\|i | CIP = ((long)Ri == 0) ? Rk : CIP++ |
| BRPL i,*k | Branch to *Rk if (Ri > 0) | 1A\|000\|k\|i | CIP = ((long)Ri > 0) ? Rk: CIP++ |
| BRMI i,*k | Branch to *Rk if (Ri < 0) | 1B\|000\|k\|i | CIP = ((long)Ri < 0) ? Rk: CIP++ |
| BIEQ i,UADDR | Branch to UADDR+*R0+CIP++ if (Ri == 0) | 1C\|UADDR\|i | CIP = ((long)Ri == 0) ? (UADDR+*R0) +CIP++: CIP++ |
| BIPL i,UADDR | Branch to UADDR+*R0+CIP++ if (Ri > 0) | 1D\|UADDR\|i | CIP = ((long)Ri > 0) ? (UADDR+*R0) +CIP++: CIP++ |
| BIMI i,UADDR | Branch to UADDR+*R0+CIP++ if (Ri < 0) | 1E\|UADDR\|i | CIP = ((long)Ri < 0) ? (UADDR+*R0) +CIP++: CIP++ |
| L i,j,k | microprogram jumpmap via tuple {i,j,k} | 1F\|j\|k\|i | no state change to M1 Registers |

What is claimed is:

1. In a computer system capable of issuing a plurality of instructions in parallel, a method for determining the number of instructions that can be issued without conflict, the method comprising the steps of:

assigning an order number to each instruction within an issue consideration group;

determining for each instruction a first index for the first source register file of the instruction;

determining for each instruction a second index for the second source register file of the instruction;

determining for each instruction a third index for the result destination file of the instruction;

comparing the third indices of the instructions in the issue consideration group to determine an instruction at which a destination register file conflict exists comprising the steps of, a) using a first instruction to create a list of previously considered instructions;

b) retrieving the instruction having the next highest order number as the current instruction under consideration;

c) determining whether the destination register file of the current instruction is the same as the destination register file of any instruction in the list;

comparing the third index to the first and second indices for each instruction in the issue consideration group to determine an instruction at which a source register file conflict exists.

2. In a computer system capable of issuing a plurality of instructions in parallel, a method for determining the number of instructions that can be issued without conflict, the method comprising the steps of:

assigning an order number to each instruction within an issue consideration group;

determining for each instruction a first index for the first source register file of the instruction;

determining for each instruction a second index for the second source register file of the instruction;

determining for each instruction a third index for the result destination file of the instruction;

comparing the third indices of the instructions in the issue consideration group to determine an instruction at which a destination register file conflict exists; and comparing the third index to the first and second indices for each instruction in the issue consideration group to determine an instruction at which a source register file conflict exists comprising the steps of, a) selecting the instruction having the second lowest order number as a current instruction under consideration;
b) determining whether the third index for the current instruction is the same as the second index for the current instruction;
c) determining whether the third index for the current instruction is the same as the first index for the current instruction;
d) outputting an instruction order number of the current instruction minus one if the third index for the current instruction is not the same as the second index for the current instruction;
e) outputting an instruction order number of the current instruction minus one if the third index for the current instruction is not the same as the third index for the current instruction; and
f) selecting the instruction having the next higher order number as the current instruction under consideration if the second index is equal to the third index and the first index.

3. A computer system which issues a plurality of instructions in parallel comprising:
a central memory for storing sequences of said instructions:
a plurality of functional units for processing data in accordance with said sequences of instructions:
a plurality of register files for supplying data to said functional units and for receiving data from said functional units:
an instruction buffer for receiving said sequences of instructions transferred from said memory; and
a control unit which receives an issue consideration group comprising a set of instructions transferred from said memory and which automatically determines a largest subset of instructions within said issue consideration group which can be simultaneously issued to said functional units without conflicts, said control unit comprising;
means for assigning an order number to each instruction within said issue consideration group;
means for determining for each instruction a first index for the first source register file of the instruction;
means for determining for each instruction a second index for the second source register file of the instruction;
means for determining for each instruction a third index for the result destination file of the instruction;
means for comparing the third indices of the instructions in the issue consideration group to determine the instruction at which a destination register file exists comprising,
means for using a first instruction to create a list of previously considered instructions;
means for retrieving the instruction having the next highest order number as the current instruction under consideration;
means for determining whether the destination register file of the current instruction is the same as the destination register file of any instruction in the list;
means for adding the current instruction to the list and invoking said means for retrieving the instruction if the destination register file of the current instruction is not the same as the destination register file of any instruction in the list; and
means for outputting the order number of the current instruction under consideration minus one if the destination register file of the current instruction is the same as the destination register file of any instruction in the list; and
means for comparing the third index to the first and second indices for each instruction in the issue consideration group to determine the instruction at which a source register file conflict exists.

4. A computer system which issues a plurality of instructions in parallel comprising:
a central memory for storing sequences of said instructions:
a plurality of functional units for processing data in accordance with said sequences of instructions:
a plurality of register files for supplying data to said functional units and for receiving data from said functional units:
an instruction buffer for receiving said sequences of instructions transferred from said memory; and
a control unit which receives an issue consideration group comprising a set of instructions transferred from said memory and which automatically determines a largest subset of instructions within said issue consideration group which can be simultaneously issued to said functional units without conflicts, said control unit comprising;
means for assigning an order number to each instruction within said issue consideration group;
means for determining for each instruction a first index for the first source register file of the instruction;
means for determining for each instruction a second index for the second source register file of the instruction;
means for determining for each instruction a third index for the result destination file of the instruction;
means for comparing the third indices of the instructions in the issue consideration group to determine the instruction at which a destination register file exists comprising,
means for comparing the third index to the first and second indices for each instruction in the issue consideration group to determine the instruction at which a source register file conflict exists comprising,
means for selecting the instruction having the second lowest order number as a current instruction under consideration:
means for determining whether the third index for the current instruction is the same as the second index for the current instruction;
means for determining whether the third index for the current instruction is the same as the first index for the current instruction;
means for outputting an instruction order number of the current instruction minus one if the third index for the current instruction is not the same as the second index for the current instruction;
means for outputting an instruction order number of the current instruction minus one if the third index for the current instruction is not the same as the third index for the current instruction; and
means for selecting the instruction having the next higher order number as the current instruction under consideration if the second index is equal to the third index and the first index.

* * * * *

UNITED STATES PATENT AND TRADEMARK OFFICE
CERTIFICATE OF CORRECTION

PATENT NO   :   5,826,096

DATED       :   October 20, 1998

INVENTOR(S) :   Michael Alan Baxter

It is certified that error appears in the above-identified patent and that said Letters Patent is hereby corrected as shown below:

In the claims:

Claim 1, Column 27, line 66, please insert the following paragraphs after step c) - -d) adding the current instruction to the list and returning to step b) if the destination register file of the current instruction is not the same as the destination register file of any instruction in the list; and e) outputting the order number of the current instruction under consideration minus one if the destination register file of the current instruction is the same as the destination register file of any instruction in the list; and- -.

Signed and Sealed this

Twenty-third Day of March, 1999

*Attest:*

Q. TODD DICKINSON

*Attesting Officer*       *Acting Commissioner of Patents and Trademarks*